United States Patent
Surendran et al.

(10) Patent No.: US 11,971,881 B1
(45) Date of Patent: Apr. 30, 2024

(54) SYSTEMS AND METHODS FOR REAL-TIME RECORDING OF TRANSFERS OF SELF-VALIDATING DIGITAL RECORDS ACROSS CRYPTOGRAPHICALLY SECURE NETWORKS USING CROSS-NETWORK REGISTRIES

(71) Applicant: Citibank, N.A., New York, NY (US)

(72) Inventors: Nisha Surendran, London (GB); Shishir Singh, Staten Island, NY (US); Jack White, London (GB); Justin Karol, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 18/487,971

(22) Filed: Oct. 16, 2023

(51) Int. Cl.
| | |
|---|---|
| *G06F 16/23* | (2019.01) |
| *G06F 9/54* | (2006.01) |
| *G06F 21/64* | (2013.01) |
| *G06Q 20/36* | (2012.01) |
| *G06Q 20/38* | (2012.01) |
| *G06Q 20/40* | (2012.01) |
| *G06Q 30/018* | (2023.01) |
| *G06Q 40/02* | (2023.01) |
| *H04L 9/00* | (2022.01) |
| *H04L 9/32* | (2006.01) |

(52) U.S. Cl.
CPC .......... *G06F 16/2379* (2019.01); *G06F 9/541* (2013.01); *G06F 21/645* (2013.01); *G06F 2209/547* (2013.01); *G06Q 20/363* (2013.01); *G06Q 20/38215* (2013.01); *G06Q 20/3825* (2013.01); *G06Q 20/4014* (2013.01); *G06Q 30/018* (2013.01); *G06Q 40/02* (2013.01); *H04L 9/3236* (2013.01); *H04L 9/3247* (2013.01); *H04L 9/50* (2022.05)

(58) Field of Classification Search
CPC .... G06F 16/2379; G06F 9/541; G06F 21/645; G06F 2209/547; G06Q 20/363; G06Q 20/38215; G06Q 20/3825; G06Q 20/4014; G06Q 30/018; G06Q 40/02; H04L 9/3236; H04L 9/3247; H04L 9/50
See application file for complete search history.

(56) References Cited

U.S. PATENT DOCUMENTS

| | | | |
|---|---|---|---|
| 2019/0172026 A1* | 6/2019 | Vessenes | G06Q 20/065 |
| 2023/0036439 A1* | 2/2023 | Olson | H04L 9/3236 |
| 2023/0169510 A1* | 6/2023 | Koh | G06Q 20/3825 705/71 |
| 2023/0421543 A1* | 12/2023 | Doney | H04L 9/50 |

* cited by examiner

Primary Examiner — Robert W Beausoliel, Jr.
Assistant Examiner — Mohammad S Bhuyan
(74) Attorney, Agent, or Firm — Perkins Coie LLP

(57) ABSTRACT

Systems and methods for novel uses and/or improvements to blockchains and blockchain technology. As one example, systems and methods are described herein for self-validating digital records that may be transferred in real-time through a cross-network registry. For example, in a conventional system, minting a token (e.g., a digital record) involves writing a self-executing program that defines the transfer rules of the digital record. Once the self-executing program is written, it is deployed on a blockchain, and the digital record is minted by publishing it to a blockchain.

20 Claims, 11 Drawing Sheets

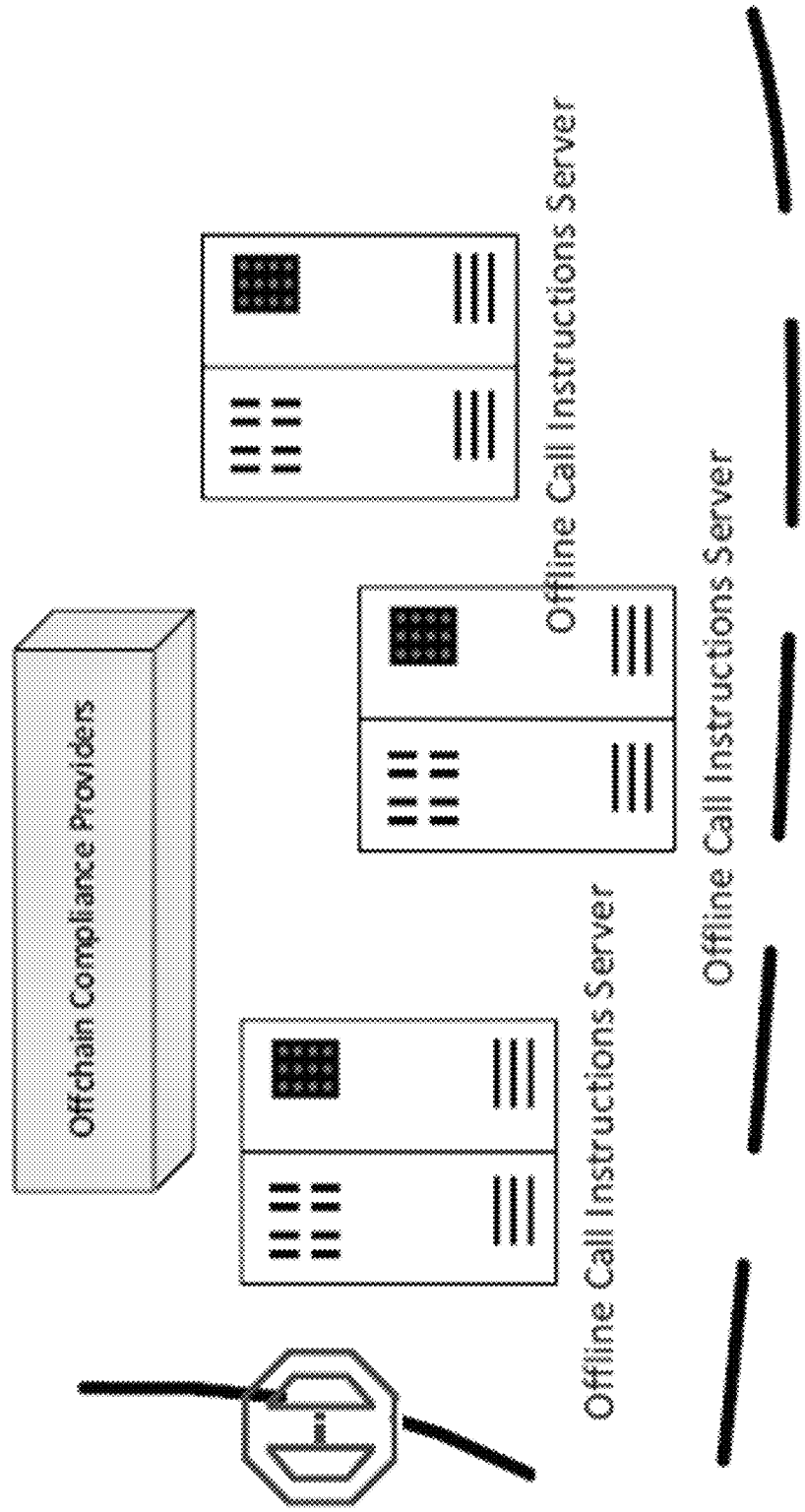

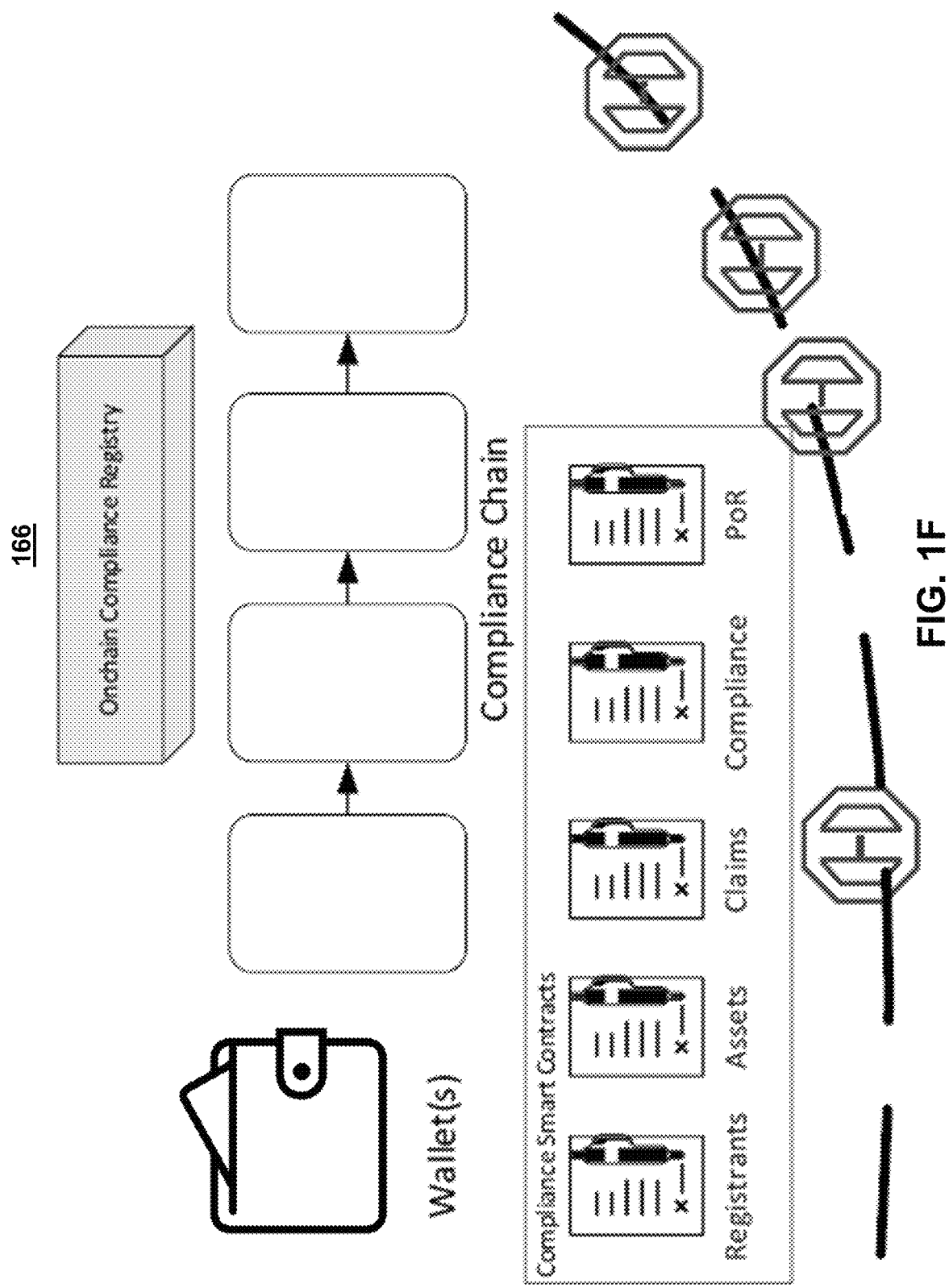

SYSTEMS AND METHODS FOR REAL-TIME RECORDING OF TRANSFERS OF SELF-VALIDATING DIGITAL RECORDS ACROSS CRYPTOGRAPHICALLY SECURE NETWORKS USING CROSS-NETWORK REGISTRIES

BACKGROUND

A blockchain is a decentralized ledger of transactions built upon a combination of cryptography techniques (e.g., secret-keys, hash functions, etc.), consensus mechanisms (e.g., Proof of Work, Proof of Stake, etc.), and computer networks (e.g., peer-to-peer ("P2P") networks, the internet, etc.). The blockchain stores information electronically, grouped together into a series of subsets of the information, called "blocks." The information may be maintained by a network of computers using cryptography and consensus mechanisms, which make the records difficult to hack or alter. Specifically, the integrity of the information in each block may be maintained through one-way cryptographic functions that make the information immutable for practical purposes.

As blocks of information are added, the various blocks form a chain, which represents an immutable record of all the previous transactions across the network. Given the immutability of the records, the public availability of the information in the blockchain, and the reliance on consensus mechanisms for adding new blocks, the blockchain does not require a central authority to monitor transactions, maintain records, and/or enforce rules. As such, blockchains and blockchain technology has become a foundation of many decentralized applications.

One tangential application of blockchain-related technology relates to its interactions with self-executing programs or smart contracts. As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code. Typically, a self-executing program is confined to a single blockchain, despite the presence of numerous blockchains and/or numerous different blockchain networks.

In view of the numerous networks, multi-chain self-executing programs have been developed that refer to self-executing programs that operate across multiple blockchain networks. While they offer potential benefits, such as scalability and interoperability, they also come with technical challenges. For example, different blockchain networks may use different consensus mechanisms (e.g., Proof of Work, Proof of Stake), and multi-chain self-executing programs that span multiple chains need to account for these variations and ensure that consensus is reached correctly across all chains. Additionally, ensuring seamless communication and data exchange between different blockchains can be challenging as a multi-chain self-executing program must understand the different protocols and formats while maintaining atomicity (all-or-nothing execution) across the multiple chains as well as handle data and logic across on-chain and off-chain resources.

One alternative to multi-chain self-executing programs is the use of sets of cross-chain self-executing programs, which comprise complementary self-executing programs on respective blockchains to create a single unified decentralized application. However, sets of cross-chain self-executing programs face many of the same challenges as multi-chain self-executing programs, including interoperability challenges due to different underlying data and logic apparatuses, and issues of atomicity caused by latency in consensus mechanisms on the different blockchains cause exponential latency in the decentralized application as a whole.

This exponential latency creates a fundamental hurdle for using decentralized applications to represent transfers of non-fungible digital records (e.g., representing off-chain records). To address this issue, transfers of off-chain records, particularly those requiring multiple independent validations and/or relying on data from multiple sources (which further exacerbates the latency issues), rely on an external, post-transfer, and off-chain confirmation that all independent validation and/or data requirements have been met.

SUMMARY

Systems and methods are described herein for novel uses and/or improvements to blockchains and blockchain technology. As one example, systems and methods are described herein for self-validating digital records that may be transferred in real time through a cross-network registry. For example, in a conventional system, minting a token (e.g., a digital record) involves writing a self-executing program that defines the transfer rules of the digital record. Once the self-executing program is written, it is deployed on a blockchain, and the digital record is minted by publishing it to a blockchain.

In contrast to this approach, the systems and methods recite the use of self-validating, non-fungible digital records. These self-validating, non-fungible digital records may be created by an issuer (e.g., a first entity) to represent an off-chain transfer (e.g., a transfer of an off-chain asset from the first entity to a second entity). However, as opposed to creating a digital record with defined transfer rules, the first entity instead creates a digital record that recites a series of pre-creation validations and/or data requirements. The digital record is then received by an off-chain server, which may facilitate the self-validating digital record's data retrieval and information gathering such that the digital record may self-validate.

Notably, as the self-validating digital record is not yet created, the self-validating digital record is not hindered by the technical issues facing multi-chain and cross-chain self-executing programs such as consensus determinations and atomicity. Once the self-validating digital record has gathered the prerequisite information to self-validate, it is prepared for creation (e.g., minting). For example, having avoided the technical issues facing multi-chain and cross-chain self-executing programs, the self-validating digital record may now be compiled into a single protocol for a blockchain (e.g., a cryptographically secure network) for minting.

To complete the creation, the self-validating digital record is posted from the off-chain server to a cross-network registry, which may then create the self-validating digital record by minting it to a given blockchain. Notably, the creation of the self-validating digital record to the blockchain itself constitutes the transfer of the off-chain record; thus, negating any of the issues of latency conventionally created by using decentralized applications and/or digital record transfers to represent transfers of off-chain records. By doing so, the systems and methods allow for real-time and/or near real-time transfers (or record generation). Furthermore, as a by-product of the use of cross-network registry, the cross-network registry may also apply validation requirements to the deployment of the self-validating digital record to the cryptographically secure network. This second set of validation requirements includes the added benefit of not being defined by the code of the self-validating digital record, thus allowing for updates to the rules and requirements that would not be available to conventional digital records (e.g., as the rules and requirements are hardcoded into the lines of code in the underlying self-executing program). Accordingly, a first entity (e.g., the issuer of the self-validating digital record) may include a set of requirements (e.g., validation parameters, off-chain assets "locks," and/or other criteria to the self-validating digital record). Upon a cross-network registry receiving confirmation that the self-validating digital record has met these requirements, the cross-network registry deploys the self-validating digital record (in the form set by the issuer) to a given blockchain and/or other on-chain registry.

In some aspects, systems and methods for real-time recording of transfers of self-validating digital records across cryptographically secure networks use cross-network registries. For example, the system may receive, at a first off-chain server, a first self-validating digital record from a first entity, wherein the first self-validating digital record corresponds to a first off-chain record designated by the first entity to be transferred to a second entity, and wherein the first self-validating digital record comprises a first validation requirement for validating the first self-validating digital record prior to creation. The system may receive, at the first off-chain server, first off-chain data. The system may determine, by the first self-validating digital record, that the first validation requirement is met based on the first off-chain data. In response to determining that the first validation requirement is met, the system may provide the first self-validating digital record to a cross-network registry, wherein the cross-network registry confirms transfer of the first off-chain record to the second entity by creating the first self-validating digital record on a first cryptographically secure network.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIGS. 1A-H show an illustrative diagram for real-time recording of transfers of records, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

FIGS. 1A-H show illustrative diagrams for real-time recording of transfers of records, in accordance with one or more embodiments. For example, the diagrams shown in FIGS. 1A-B may be involved in recording of transfers of self-validating digital records across cryptographically secure networks using cross-network registries. In particular, system 100 comprises a system for using a self-validating digital record and a cross-network registry.

As described herein, a "self-validating digital record" is a digital document or piece of data that contains built-in mechanisms for ensuring its authenticity, integrity, and validity without relying on external verification sources of the digital record. In essence, the self-validating digital record can verify itself without the need for third-party validation to do so. The self-validating digital record may validate itself using a plurality of pre-deployment validations encoded by the issuer in the self-validating digital record. The plurality of pre-deployments validations may be based on one or more pre-deployment validation characteristics.

As described herein "pre-deployment validation characteristics" comprise a characteristic of a validation that is done prior to deployment of a self-validating digital record. The pre-deployment validation characteristic may comprise any characteristic that distinguishes it from another pre-deployment validation characteristic. For example, the pre-deployment validation characteristic may comprise a characteristic that is used to validate a digital record prior to deployment.

Figure 1A:
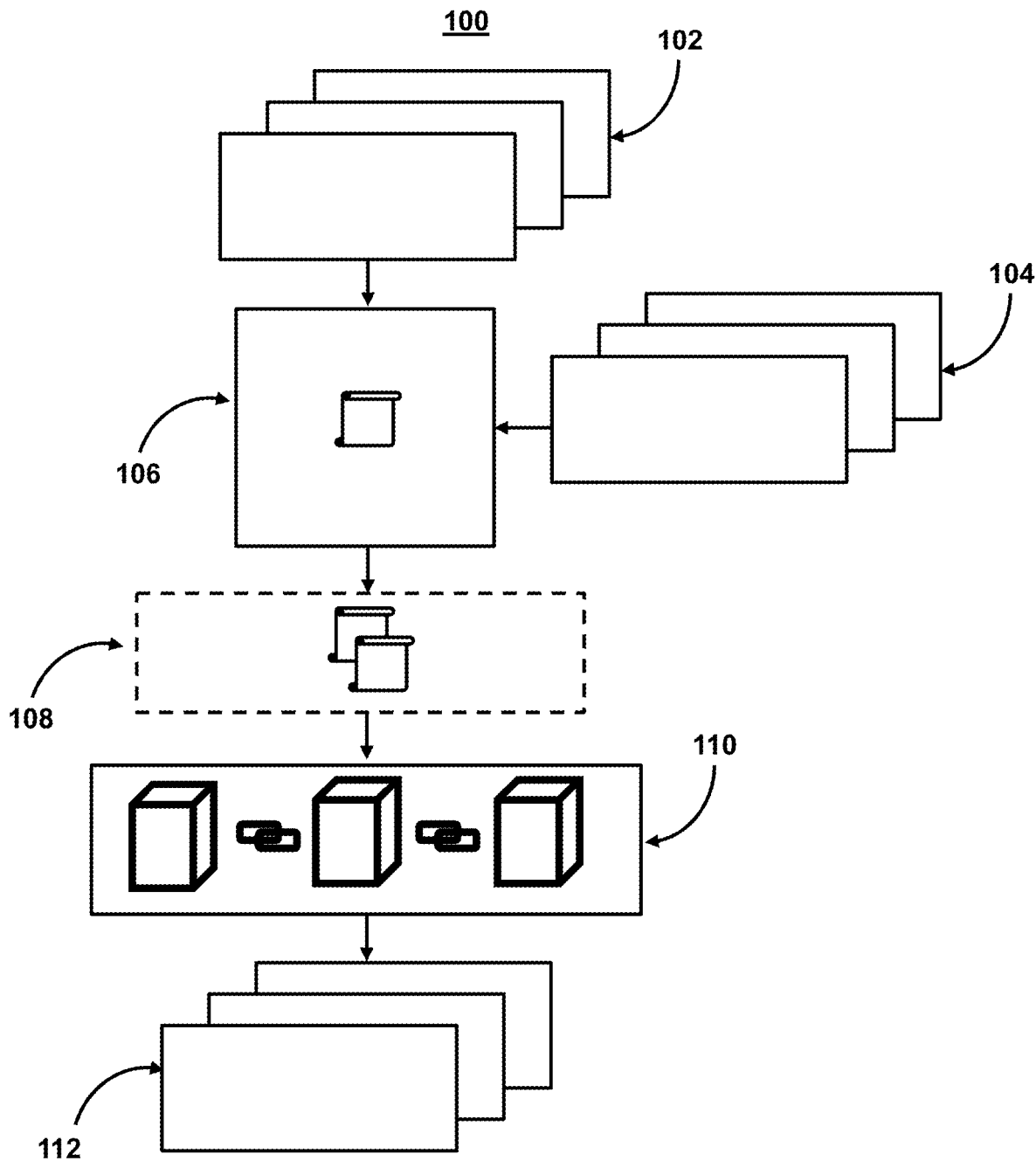

FIG. 1A shows an illustrative diagram for real-time recording of transfers of records, in accordance with one or more embodiments. For example, system 100 may execute real-time recordings of transfers (or other blockchain actions) of self-validating digital records across cryptographically secure networks using cross-network registries. For example, entity 102 (e.g., the issuer of the self-validating digital record) may include a set of requirements (e.g., validation parameters, off-chain assets "locks," and/or other criteria to the self-validating digital record). Upon cross-network registry 108 receiving confirmation that the self-validating digital record, which has been posted from off-chain server 106, has met these requirements, cross-network registry 108 deploys the self-validating digital record (in the form set by the issuer) to blockchain 110 and/or other on-chain registries as well as additional off-chain registries (e.g., entities 112). In some embodiments, off-chain server 106 may be operated and under control of disparate parties and/or be based on blockchain or traditional systems, with components establishing trust between themselves using certificates and other cryptographic techniques.

For example, a pre-deployment validation characteristic may comprise a digital signature from one or more parties. The self-validating digital records may include digital signatures, which are cryptographic techniques used to verify the authenticity and integrity of the document. A digital signature may be generated using a private key and can be verified using a corresponding public key. If the digital signature is valid, it means the document has not been tampered with and was signed by the expected party. Accordingly, the pre-deployment validation characteristic may validate the self-validating digital record based on matching the digital signature to a predetermined digital signature.

As another example, a pre-deployment validation characteristic may comprise a timestamp. To prove the pre-deployment validation characteristic temporal authenticity, a self-validating digital record may include a timestamp that records when the document was created or modified. This timestamp is typically generated by a trusted timestamping authority, providing a reliable reference point for the self-validating digital record's existence at a particular time. Accordingly, the pre-deployment validation characteristic may validate the self-validating digital record based on matching the timestamp to a predetermined timestamp and/or range.

As another example, a pre-deployment validation characteristic may comprise a hashing. The pre-deployment validation characteristic may include a hash value, which is a fixed-length string of characters generated from the content of the document using a cryptographic hash function. Any change in the content of the self-validating digital record will result in a different hash value. By comparing the hash value with the stored value, the self-validating digital record can verify if the self-validating digital record has been altered. Accordingly, the pre-deployment validation characteristic may validate the self-validating digital record based on matching the hash to a predetermined hash.

As another example, a pre-deployment validation characteristic may comprise an embedded verification logic. Some self-validating digital records incorporate embedded code or logic that allows the self-validating digital record to verify its integrity and authenticity automatically. For example, a pre-deployment validation characteristic may include self-executing code that checks the validity of the self-validating digital record and ensures compliance with predefined conditions. Accordingly, the pre-deployment validation characteristic may validate the self-validating digital record based on matching the embedded verification logic (or a result of the embedded logic) to a predetermined embedded verification logic. Validation characteristics may also include digital forms such as tokens, cryptographic proofs (e.g., zero knowledge), etc. and/or may be recorded on-chain for point in time validation requirements and auditability.

In some embodiments, the embedded verification logic may comprise a determination that a given off-chain asset is locked, and/or the pre-deployment validation characteristic may comprise that an asset is locked. Locking an asset (e.g., an off-chain asset) during an electronic transfer may mean temporarily restricting or immobilizing the asset to prevent its use, sale, or transfer by the owner or sender while the transfer process is ongoing or until certain conditions are met. In traditional banking and financial transactions, when system 100 initiates an electronic transfer (such as a wire transfer or ACH transfer), the funds may be "locked" in a secure account during the transfer process. This means that system 100 cannot access or use those funds until the transfer is completed. This ensures that the funds are available to fulfill the transfer request and reduces the risk of double spending or overdrawing. In the context of blockchain and cryptocurrencies, locking an asset typically involves one or more self-executing programs. For example, in a decentralized finance (DeFi) application, system 100 may lock a cryptocurrency token (e.g., a digital record) in a self-executing program as collateral to borrow other assets. These locked tokens may be held as collateral until system 100 repays the borrowed amount. This ensures that the lender has a guarantee of repayment. In some electronic transactions, an escrow service may be created by system 100. When system 100 enters into a transaction, the asset (e.g., payment or digital item) is placed in escrow, meaning it is temporarily held by a neutral third party (e.g., a secure account). The asset remains locked in escrow until the agreed-upon conditions are met, after which it is released to the intended recipient. In the world of initial coin offerings (ICOs) or token sales, tokens may be locked for a period of time to prevent early investors or team members from selling their tokens immediately after a project launches. Token vesting schedules specify when and how tokens can be unlocked and become transferable.

As another example, a pre-deployment validation characteristic may comprise a blockchain action and/or blockchain characteristic. A self-validating digital record may incorporate embedded code or logic that allows the self-validating digital record to verify its integrity and authenticity automatically. For example, a pre-deployment validation characteristic may include self-executing code that checks the validity of the self-validating digital record and ensures compliance with predefined conditions. Accordingly, the pre-deployment validation characteristic may validate the self-validating digital record based on matching the blockchain action and/or blockchain characteristic (or a result thereof) to a predetermined blockchain action and/or blockchain characteristic.

As another example, a pre-deployment validation characteristic may comprise a Public Key Infrastructure (PKI). Self-validating digital records may leverage PKI systems to manage digital certificates, keys, and trust relationships, allowing for secure verification of the document's authenticity and the identity of the parties involved. Accordingly, the pre-deployment validation characteristic may validate the self-validating digital record based on matching the PKI to a predetermined PKI.

The pre-deployment validation characteristics for a self-validating digital record may be received from an issuer (e.g., entity 102) at off-chain server 106. Off-chain server 106 may receive the pre-deployment validation characteristics and generate or one more self-executing programs corresponding to the pre-deployment validation characteristics. Off-chain server 106 may also receive external data from data source 104. Data source 104 may comprise an external data source that provides off-chain data (e.g., data used to determine if a pre-deployment validation characteristic has been met). For example, data source 104 may provide data indicating that a given asset (e.g., designated by entity 102) has been secured or "locked." In some embodiments, off-chain server 106 may generate one or more recommendations for manual and/or automatic review (e.g., the system may allow for certain situations plus capability to transfer and store necessary supporting evidence in the form of documents and workflows).

Based on the pre-deployment validation characteristics and the external data, off-chain server 106 may then generate one or more self-executing programs corresponding to the self-validating digital record. For example, off-chain server 106 may compile the code used to represent the pre-deployment validation characteristics and the external data into bytecode. For example, self-executing programs are typically written in high-level programming languages and then compiled into bytecode that can be executed on a blockchain platform (or by cross-network registry 108).

To do so, the system may choose a programming language that is supported by cross-network registry 108 that is intended to deploy the self-validating digital record. Common programming languages for self-executing program development may include Solidity (for Ethereum), Vyper (for Ethereum), and others specific to different blockchains like Rust (for Polkadot) or Go (for Hyperledger Fabric). System 100 (or off-chain server 106) may write code in the chosen programming language. The self-executing program defines the rules and logic that govern the behavior of the self-validating digital record. System 100 (or off-chain server 106) may then compile the self-validating digital record. System 100 (or off-chain server 106) may provide its own compiler or development tools for the specific programming language used.

System 100 (or off-chain server 106) may use the compiler to translate its high-level code (e.g., featuring both the pre-deployment validation characteristics and the external data) into bytecode. The output of this process is often in the form of a binary file containing the bytecode of the self-validating digital record. Once the self-validating digital record is compiled, the system can push the self-validating digital record to cross-network registry 108. For example, the self-validating digital record may now comprise both the pre-deployment validation characteristics and the external data needed to self-validate.

Cross-network registry 108 may receive the self-validating digital record that was previously compiled. Cross-network registry 108 may execute the self-validating digital record to receive a confirmation that the one or more pre-deployment validation characteristics have been met. For example, cross-network registry 108 may execute the self-executing programs (or bytecode thereof), at which point the self-executing programs may access and/or reference the external data included in the self-validating digital record.

Cross-network registry 108 may deploy and/or modify the compiled bytecode representing the self-validating digital record. For example, cross-network registry 108 may deploy the self-validating digital record. Alternatively or additionally, cross-network registry 108 may amend and/or add a self-executing program that further defines the rules and logic that govern the behavior of the self-validating digital record. System 100 (or cross-network registry 108) may modify and/or validate in its existing form the compiling of the self-validating digital record. That is, cross-network registry 108 may apply its own self-executing program to the self-validating digital record.

In some embodiments, the system may need to modify existing bytecode. For example, the system may receive content or a portion of content (e.g., a self-executing program, digital record, etc.) that is already compiled. Modifying pre-compiled bytecode, such as bytecode for Java classes or Python scripts, can be a complex and potentially risky task as tampering with bytecode can lead to unexpected behavior, errors, or even security vulnerabilities. To do so, the system may first identify the format of the bytecode in the content. Different programming languages and platforms have their own bytecode formats. For example, Java uses Java bytecode (.class files), Python uses Python bytecode (.pyc files), and .NET uses Common Intermediate Language (CIL) bytecode (.dll and .exe files). The system may then select a decompiler. Decompilers are tools that can reverse-engineer bytecode back into a higher-level programming language or pseudo-code. This can help the system understand the structure of the bytecode and make modifications more manageable. For Java, tools like JD-GUI, FernFlower, or CFR can be used. For Python, you can use decompilers like uncompyle6 or uncompyle2.

Once the system decompiles the bytecode, the system can make the desired modifications to the source code representation. This could involve fixing a bug, adding a feature, or making any other necessary changes. After making modifications, the system needs to recompile the code back into bytecode. This step can be challenging because the system needs to ensure that the bytecode structure remains compatible with the original runtime environment. Some languages like Python might not provide straightforward tools for recompilation. In such cases, the system may need to create a new script or use a tool like Cython to generate new bytecode. The system may then test the new bytecode. Testing is crucial to ensure that the modified bytecode behaves as expected and does not introduce any new issues. The system may then use the new bytecode (e.g., to generate a self-executing program, digital record, etc.).

Cross-network registry 108 may then deploy the self-validating digital record to a selected blockchain network (e.g., blockchain 110). Deployment involves sending a transaction to a specific address on the blockchain (e.g., as identified in the self-validating digital record), which creates an instance of the self-validating digital record on blockchain 110. The instance of the self-validating digital record on blockchain 110 may then be accessed and/or detected by one or more entities (e.g., entities 112).

For example, the self-validating digital record may be posted from off-chain server 106 to cross-network registry 108, which may then create the self-validating digital record by minting it to blockchain 110. Notably, the creation of the self-validating digital record to the blockchain itself constitutes the transfer of the off-chain record; thus, negating any of the issues of latency conventionally created by using decentralized applications and/or digital record transfers to represent transfers of off-chain records. By doing so, the systems and methods allow for real-time and/or near real-time transfers. Furthermore, as a by-product of the use of cross-network registry 108, cross-network registry 108 may also apply validation requirements to the deployment of the self-validating digital record to the cryptographically secure network. This second set of validation requirements includes the added benefit of not being defined by the code of the self-validating digital record, thus allowing for updates to the rules and requirements that would not be available to conventional digital records (e.g., as the rules and requirements are hardcoded into the lines of code in the underlying self-executing program).

Figure 1B:
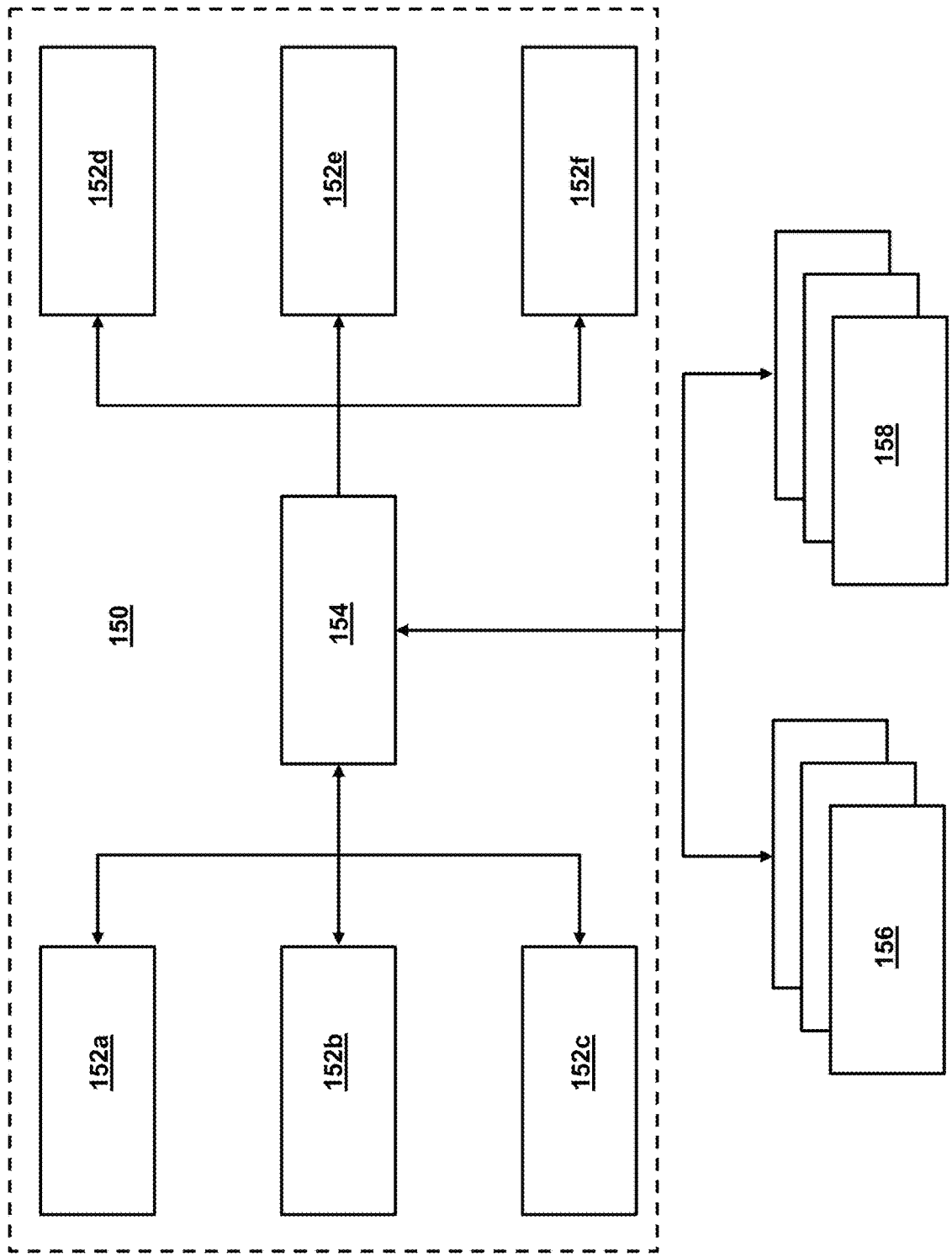

FIG. 1B shows an illustrative diagram for executing self-executing programs at a cross-network registry, in accordance with one or more embodiments. For example, cross-network registry 150 may perform a plurality of pre-deployment validations (e.g., validations 152*a-f*) based on the pre-deployment validation characteristics and the external data.

In some embodiments, cross-network registry 150 may comprise a centralized location and/or dashboard for monitoring the validation process. For example, cross-network registry 150 may comprise a user interface. As referred to herein, a "user interface" may comprise a mechanism for human-computer interaction and communication in a device and may include display screens, keyboards, a mouse, and the appearance of a desktop. For example, a user interface may comprise a way for a user to interact with and/or access an application, website, and/or other program in order to monitor and/or record transfers of records. A user interface may display content related to recording of transfers of self-validating digital records across cryptographically secure networks using cross-network registries. As referred to herein, "content" should be understood to mean an electronically consumable user record, representations of goods or services (including nonfungible digital records), internet content (e.g., streaming content, downloadable content, webcasts, etc.), video data, audio data, image data, and/or textual data, etc.

Cross-network registry 150 may perform the validations using one or more self-executing programs (e.g., self-executing program 154) located at cross-network registry 150. As referred to herein, a "self-executing program" comprises a program in which rules for execution are written into lines of code. The code and the rules contained therein may then exist across a distributed, decentralized blockchain network. For example, a self-executing program may comprise a contract in which the terms of the agreement between buyer and seller are written into lines of code. In some embodiments, blockchain actions may also comprise actions related to a self-executing program (e.g., a smart contract).

Upon determining that one or more of the validations (e.g., validations 152*a-f*) have been completed, cross-network registry 150 may deploy a self-validating digital record (e.g., which has now self-validated itself) to one or more on-chain registries and/or blockchain networks (e.g., on-chain registry 156) and/or one or more centralized registries (e.g., off-chain registry 158). That is, the self-validating digital record (or the self-executing programs comprising the self-validating digital record) may notify cross-network registry 150 that the self-validating digital record is ready for deployment.

For example, cross-network registry 150 may compile and/or deploy the self-validating digital record (e.g., a token) to a blockchain network (e.g., on-chain registry 156). In conventional systems, tokens are not compiled in the same way that self-executing programs are. Tokens on a blockchain are created using standardized self-executing program templates, also known as token standards, and they are not compiled into bytecode like self-executing programs. Instead, tokens are minted or generated through the execution of specific functions within a self-executing program.

As shown in FIG. 1B, cross-network registry 150 may deploy the compiled self-validating digital record by executing the compiled self-validating digital record to mint or create an on-chain representation. The on-chain representation of the self-validating digital record may, in some instances, represent confirmation of a transfer of an off-chain asset tied to the self-validating digital record. As such, the transfer occurs in real time and does not require subsequent confirmation. Entities relying on the appearance of the self-validating digital record on a blockchain (e.g., off-chain registry 158) may thus monitor a given blockchain (or index thereof) to determine whether a transfer of the off-chain asset is complete.

Figure 1C:
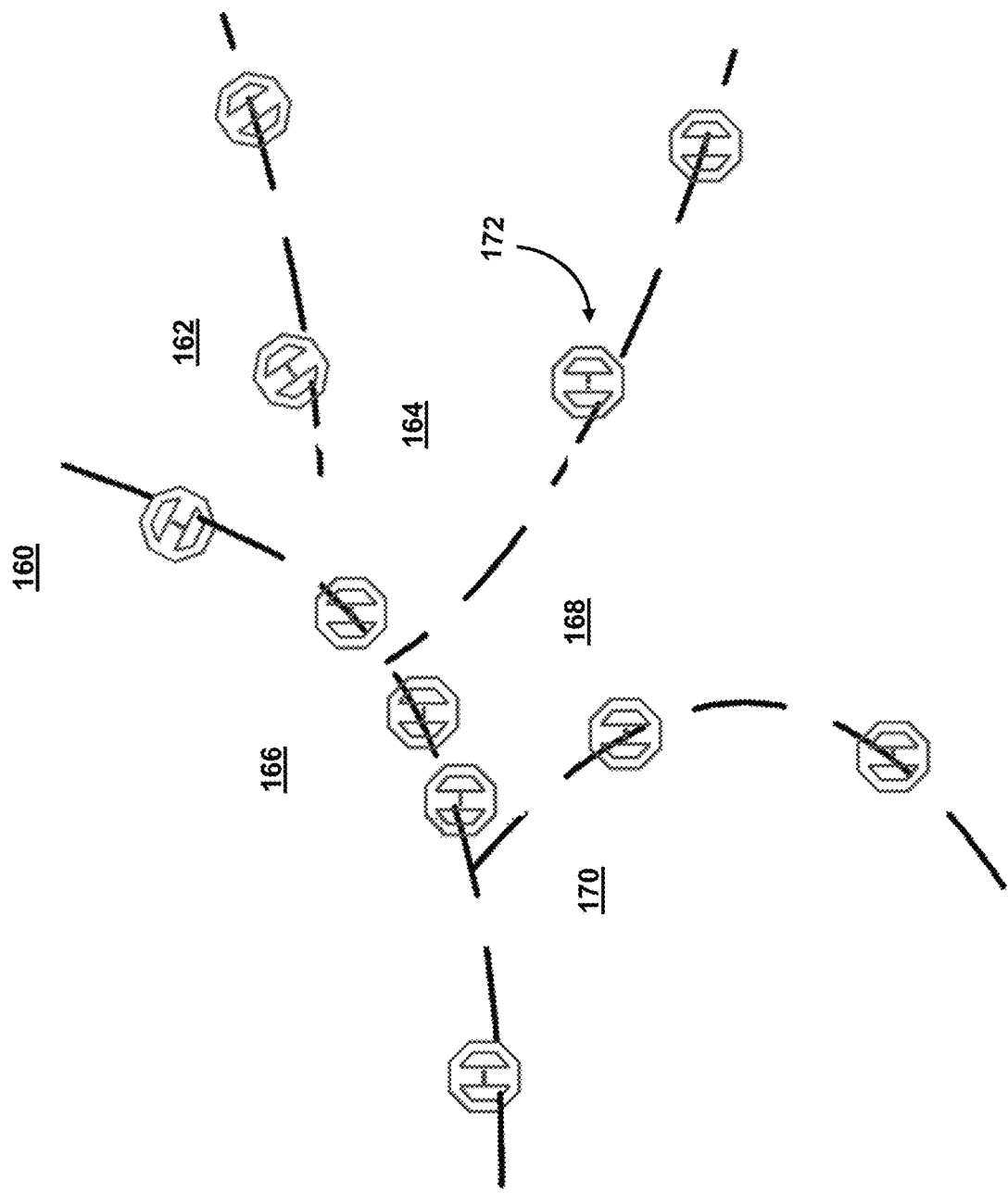

FIG. 1C illustrates a network for real-time recording of transfers of records. For example, it should be noted that as opposed to a linear flow, the embodiments described herein may comprise a network that uses self-validating digital records and cross-network registries. FIG. 1C includes network 160, which itself may include a plurality of other networks. For example, network 160 may include network 162, network 164, network 166, network 168, and network 170. Each of the various networks may be connected by one or more connection points (e.g., connection 172). Each of these connection points may represent one or more oracles and/or one or more application program interfaces (e.g., APIs). In the context of blockchain technology and cryptocurrencies, an "oracle" may refer to a mechanism or service that provides external data to a blockchain network. A "network oracle" may be a service or system that provides external data to a broader network of blockchains or decentralized applications (dApps). An oracle may refer to a system that predicts or provides information about network conditions, such as network performance, congestion, or security. A network oracle may be a predictive tool or service that helps network administrators make informed decisions about managing and optimizing their network infrastructure. In the context of machine learning and artificial intelligence, an oracle may refer to a system or model that provides expert guidance or predictions. An oracle may imply a specialized AI or machine learning model designed to provide insights or predictions related to network-related tasks, such as traffic prediction, anomaly detection, or network optimization.

FIG. 1D illustrates a data source for determining compliance requirements (e.g., validation characteristics) for a self-validating digital record. For example, in some embodiments, network 162 may correspond to data source 104 (FIG. 1). An off-chain compliance provider, also known as an off-chain oracle or off-chain data provider, may be a service or entity that facilitates the integration of external, real-world data into blockchain-based smart contracts and decentralized applications (DApps). In the context of blockchain and cryptocurrencies, compliance often refers to adhering to regulatory requirements, such as Know Your Customer (KYC) and Anti-Money Laundering (AML) regulations.

Figure 1E:
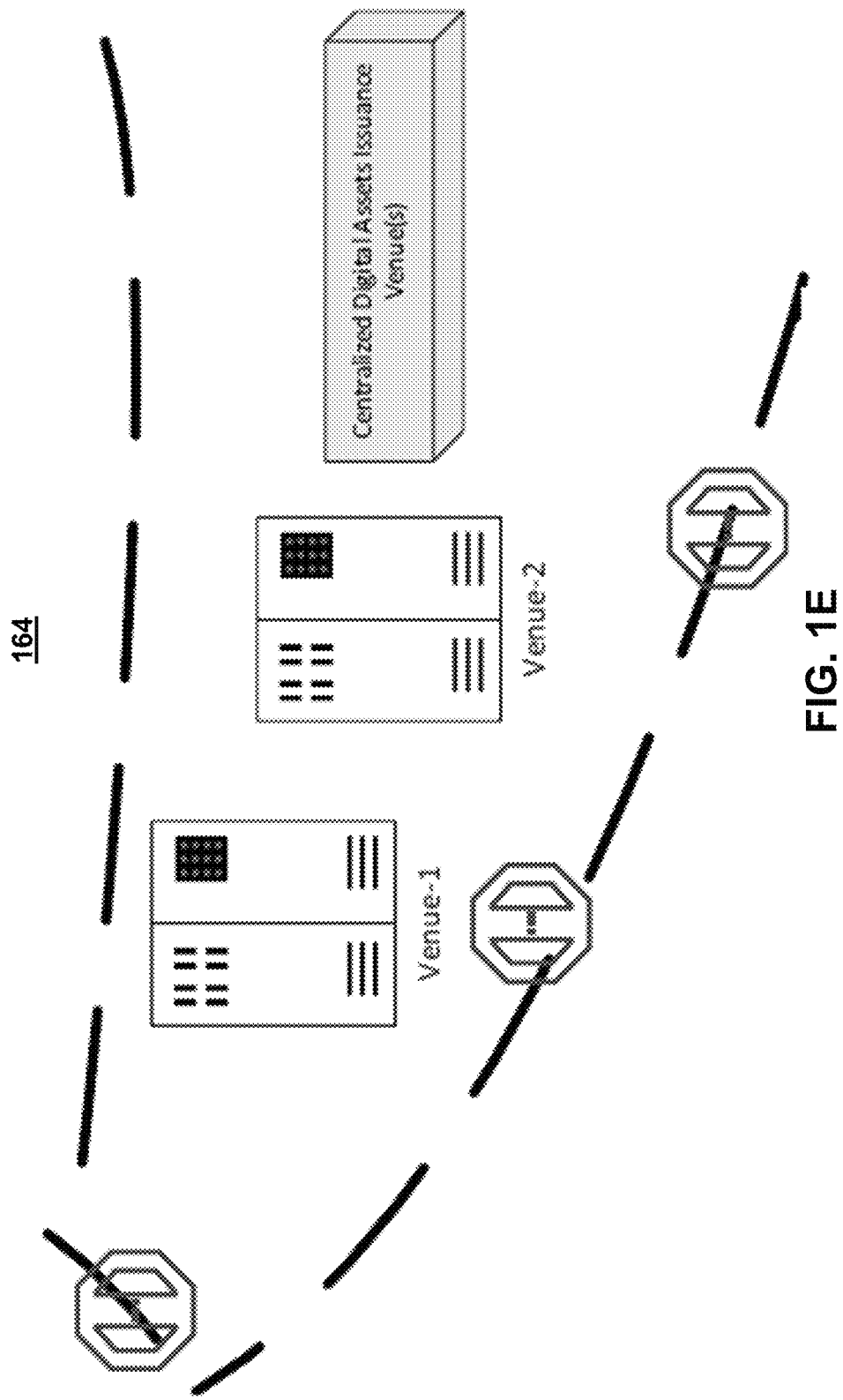

FIG. 1E illustrates an issuer of a self-validating digital record such as an off-chain compliance provider. For example, in some embodiments, network 164 may correspond to entity 102 (FIG. 1). A digital asset issuer is an entity or organization that creates and issues digital assets, often in the form of tokens or coins, on a blockchain or distributed ledger technology (DLT) platform. These digital assets can represent various forms of value, ownership, or rights and are typically designed to be traded or exchanged within a blockchain ecosystem. Digital asset issuers tokenize real-world assets or create native blockchain assets. Tokenization involves converting physical or abstract assets (such as real estate, stocks, bonds, or even unique digital collectibles) into digital tokens that can be easily managed, transferred, and traded on a blockchain. Digital asset issuers may choose a specific blockchain or DLT platform to create and manage their tokens. Popular choices include Ethereum, Binance Smart Chain, and others. The choice of platform can impact factors like security, scalability, and interoperability.

FIG. 1F illustrates a compliance registry. The compliance registry may be on-chain or off-chain. For example, in some embodiments, network 166 may correspond to off-chain server 106 (FIG. 1). However, in some embodiments, off-chain server 106 may be an on-chain registry. An on-chain compliance registry may refer to a blockchain-based system or smart contract that maintains a record of compliance-related information, transactions, or assets on a blockchain or distributed ledger. It is a tool used to ensure that transactions or activities conducted on a blockchain network adhere to specific regulatory requirements and standards. The registry records various compliance-related data on the blockchain. This data can include information related to identity verification (Know Your Customer or KYC), Anti- Money Laundering (AML) checks, accreditation status, or any other regulatory requirements relevant to the blockchain network's use case. When a transaction is initiated on the blockchain, the on-chain compliance registry may check whether the involved parties or assets comply with the established regulations. For example, it can verify that both the sender and receiver of cryptocurrency tokens have completed the necessary KYC and AML checks. Network 166 may enforce access control policies. This means that certain actions or transactions on the blockchain can only be executed if the involved parties meet specific compliance criteria. For instance, a token transfer may be allowed only if both parties have been verified as accredited investors. In some embodiments, network 166 may maintain a transparent and immutable record of compliance-related activities on the blockchain. This record can be audited and reported to regulatory authorities, providing transparency and accountability to ensure compliance.

Figure 1G:
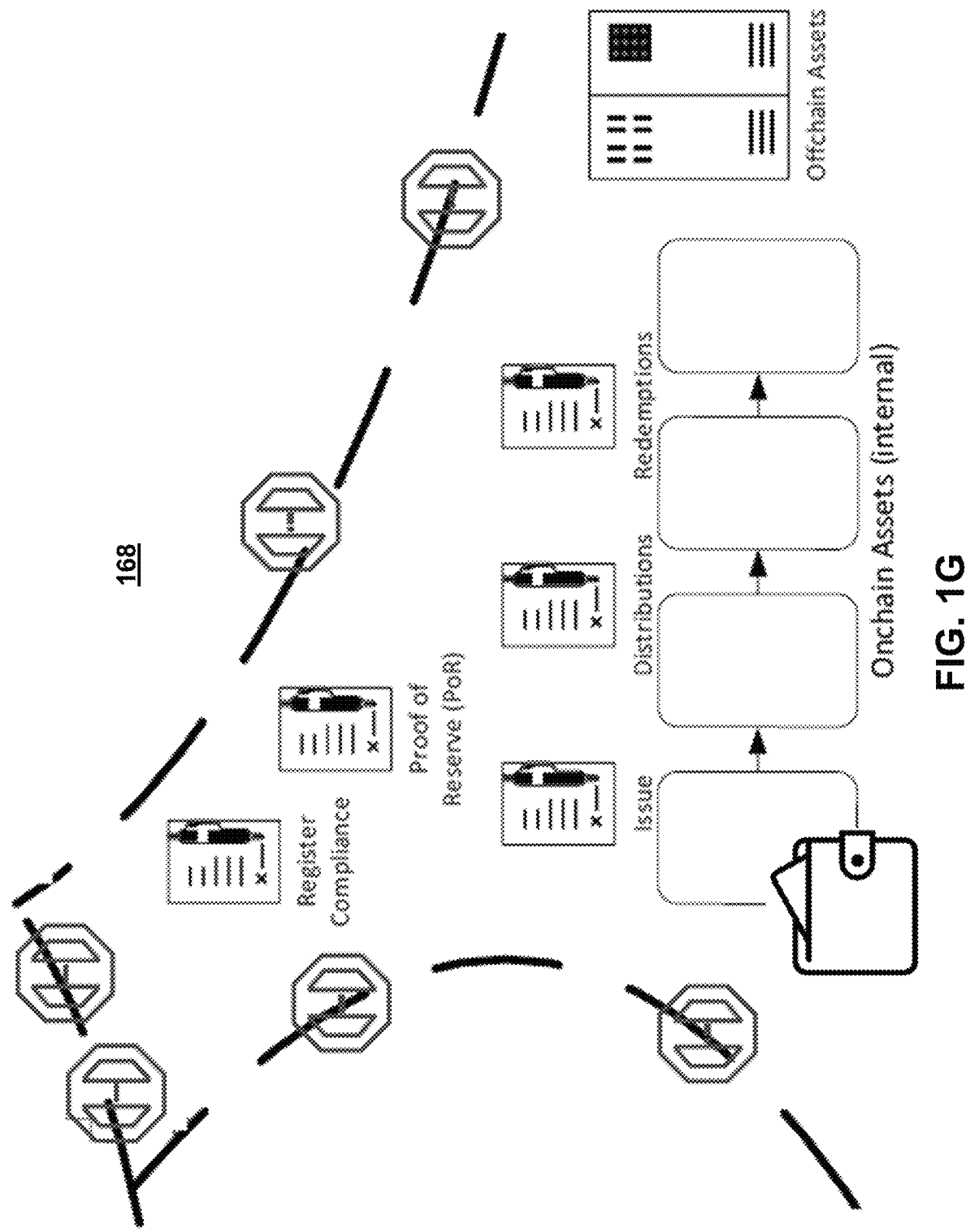

FIG. 1G illustrates a cross-network registry. For example, in some embodiments, network 168 may correspond to cross-network registry 108 (FIG. 1). For example, network 168 may include on-chain and off-chain registries. Network 168 may also provide for monitoring for blockchain actions related to self-validating digital records before, during, and/or after the self-validating record is created an/or published to a blockchain. For example, the system may perform one or more validations and/or monitor for one or more validation requirements and/or characteristics. These validations may be related to Know Your Customer (KYC), which may identity verification of individual investors and/or perform background checks for any criminal history or financial malfeasance. Know Your Transaction (KYT), which may monitoring and analyzing transaction patterns and/or identifying suspicious activities or unusual transaction volumes.

In some embodiments, these validations may be related to Know Your Business (KYB), which may perform verifications of business entities investing or transacting and/or check the legitimacy and legal standing of the business. Domicile Checks which may ensure investors are from jurisdictions where the token is allowed and/or restrict or allow functionalities based on the investor's domicile. Shareholder Checks, which ensure that an individual or entity doesn't exceed a certain percentage of ownership and/or comply with regulations on maximum shareholders for certain types of entities. Proof of Reserves that include Asset Audits (e.g., regular third-party audits to verify the existence and value of underlying assets) and Real-time Transparency (e.g., real-time transparency into reserves through blockchain attestations), collateralization ratios (e.g., ensuring collateralization ratios meet required thresholds).

In some embodiments, these validations may be related to Proof of Asset Ownership checks such as title verification, lien checks to ensure no undisclosed liens on the underlying asset, and/or valuation checks (e.g., regular appraisals or valuations of the underlying asset and/or integration with trusted price oracles for real-time valuation). Operational checks such as operational audits for compliance with regulations and best practices and/or technology security audits. In some embodiments, these validations may be related to Liquidity Checks such as ensuring sufficient liquidity for the security token and redemption guarantees for tokens with redemption mechanisms.

In some embodiments, these validations may be related to Conflict of Interest Checks such as ensuring no conflicts among the issuer, intermediaries, and other parties. In some embodiments, these validations may be related to regulatory reporting such as timely and accurate reporting to securities regulators. In some embodiments, these validations may be related to Data Privacy and Protection such as protecting personal data of token holders and investors. In some embodiments, these validations may be related to investor communication and mechanisms for timely communication with investors. In some embodiments, these validations may be related to dispute resolution such as clearing mechanisms for resolving disputes between the issuer and token holders. In some embodiments, these validations may be related to insurance such as insurance coverage for underlying assets or the issuance platform. In some embodiments, these validations may be related to token governance (e.g., mechanisms for token governance, such as voting) and/or Whitelist/Blacklist Management (e.g., managing approved investors (whitelist) and restricted entities (blacklist)).

Figure 1H:
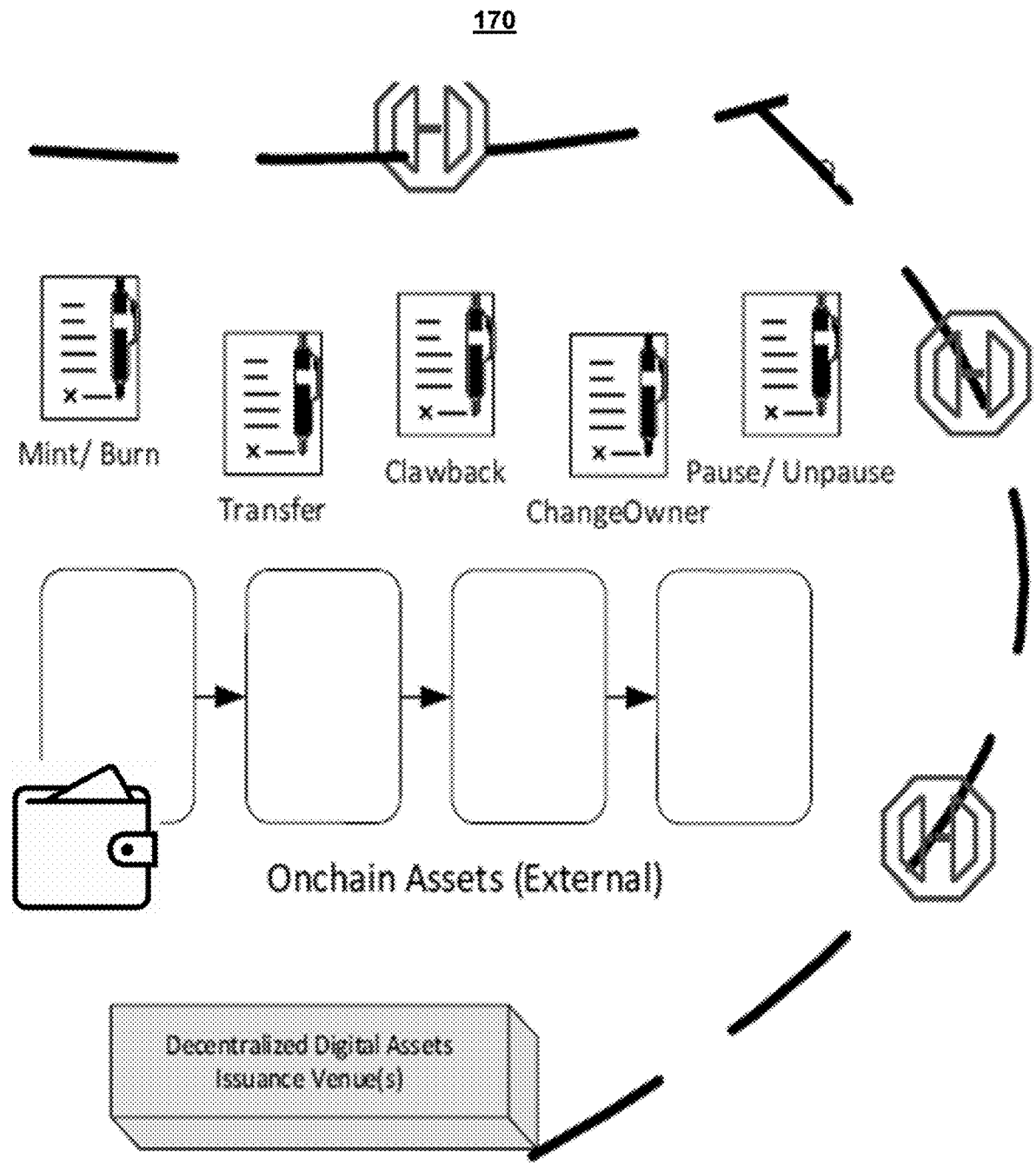

FIG. 1H illustrates a blockchain and/or blockchain related application. For example, in some embodiments, network 170 may correspond to blockchain 110 (FIG. 1). For example, network 170 may include a blockchain, and the system (e.g., a cross-network registry) may monitor the blockchain for additional and/or related blockchain actions (e.g., minting record, transferring records, claw back of records, change in ownership of record, etc.).

Figure 2:
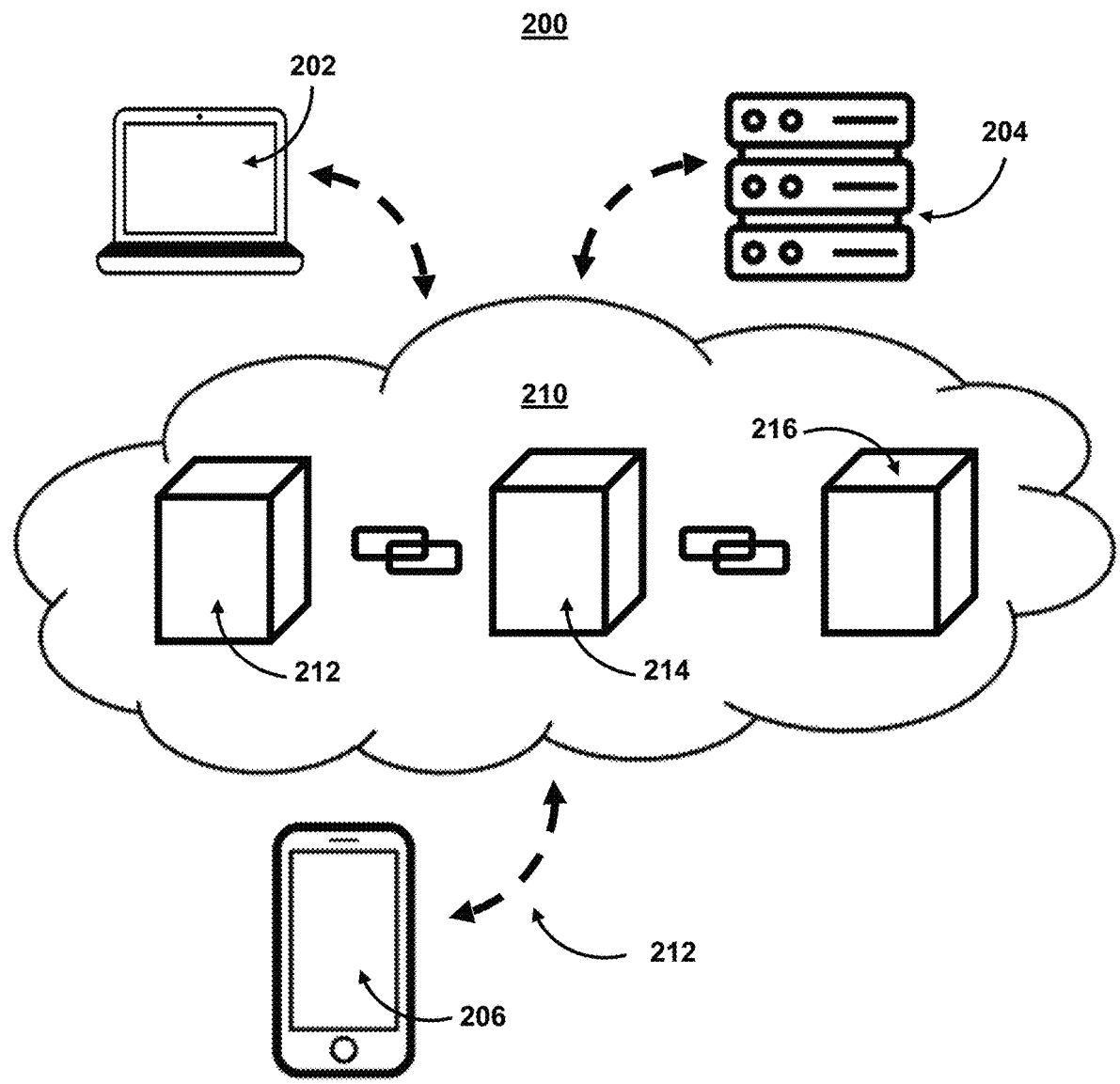
FIG. 2 shows an illustrative diagram of a blockchain network, in accordance with one or more embodiments.

FIG. 2 shows an illustrative diagram of a blockchain network, in accordance with one or more embodiments. For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by one or more clients, which behaves like an actual computer) for the system. The data structure may comprise one or more devices and/or components, which may act in concert to facilitate blockchain 210.

As referred to herein, blockchain 210 may comprise a type of distributed ledger technology that consists of a growing list of records, called blocks (e.g., block 212, block 214, and block 216), that are securely linked together using cryptography. Each block may contain a cryptographic hash of the previous block (e.g., block 216 may contain a cryptographic hash of block 214), and that cryptographic hash may itself be based on a state of a preceding block (e.g., the cryptographic hash of block 216 is based not only on the state of block 214, but also block 212). For example, each block may include a timestamp and blockchain action data (e.g., represented as a Merkle tree, where data nodes are represented by leaves). The timestamp proves that the blockchain action data (e.g., the state of the block) existed when the block was created. As each block is based on information about the previous block, the blocks effectively form a chain with each additional block linking to the ones before it. Consequently, blockchain actions are irreversible in that, once they are recorded, the data in any given block cannot be altered retroactively without altering all subsequent blocks.

Blockchains are typically managed by a peer-to-peer (P2P) computer network for use as a public distributed ledger, where nodes collectively adhere to a consensus algorithm protocol to add and validate new transaction blocks. Although, in some embodiments, a blockchain may be managed by a private consortium of computers. While blockchain records are not unalterable, since blockchain forks are possible, blockchains may be considered secure by design and exemplify a distributed computing system with high Byzantine fault tolerance.

As shown in FIG. 2, system 200 comprises user device 202, user device 204, and user device 206. It should be noted that, while shown as a smartphone, a personal computer, and a server in FIG. 2, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 200 performing a blockchain action may equally be applied to, and correspond to, an individual user device (e.g., user device 202, user device 204, and/or user device 206) performing the blockchain action. That is, system 200 may correspond to the user devices (e.g., user device 202, user device 204, and/or user device 206) collectively or individually.

For example, system 200 may comprise a plurality of nodes for blockchain 210. Each node may correspond to a user device (e.g., user device 202, user device 204, and/or user device 206). A node for a blockchain network may comprise an application or other software that records and/or monitors peer connections to other nodes and/or miners for the blockchain network. For example, a miner comprises a node in a blockchain network that facilitates blockchain actions by verifying blockchain actions on the blockchain, adding new blocks to the existing chain, and/or ensuring that these additions are accurate. The nodes may continually record the state of the blockchain and respond to remote procedure requests for information about the blockchain.

In some embodiments, the user devices of system 200 may comprise one or more cloud components. For example, cloud components may be implemented as a cloud computing system and may feature one or more component devices. It should also be noted that system 200 is not limited to three devices. Users may, for instance, utilize one or more devices to interact with one another, one or more servers, or other components of system 200. It should be further noted that while one or more actions (e.g., blockchain actions) are described herein as being performed by a particular component (e.g., user device 202) of system 200, those actions may, in some embodiments, be performed by other components of system 200. As an example, while one or more actions are described herein as being performed by components of user device 202, those actions may, in some embodiments, be performed by one or more cloud components. In some embodiments, the various computers and systems described herein may include one or more computing devices that are programmed to perform the described functions. Additionally, or alternatively, multiple users may interact with system 200 and/or one or more components of system 200. For example, in one embodiment, a first user and a second user may interact with system 200 using two different components (e.g., user device 204 and user device 206, respectively). Additionally, or alternatively, a single user (and/or a user account linked to a single user) may interact with system 200 and/or one or more components of system 200 using two different components (e.g., user device 202 and user device 206, respectively).

With respect to the components of system 200, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 2, both user device 202 and user device 206 include a display upon which to display data (e.g., content related to one or more blockchain actions).

Additionally, the devices in system 200 may run an application (or another suitable program). The application may cause the processors and/or control circuitry to perform operations related to a cross-network registry for self-validating digital records (e.g., tokens) within a decentralized application environment.

Each of these devices may also include electronic storage. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 2 also includes blockchain 210, which may comprise communication paths between user devices. The communication paths may include the internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3:
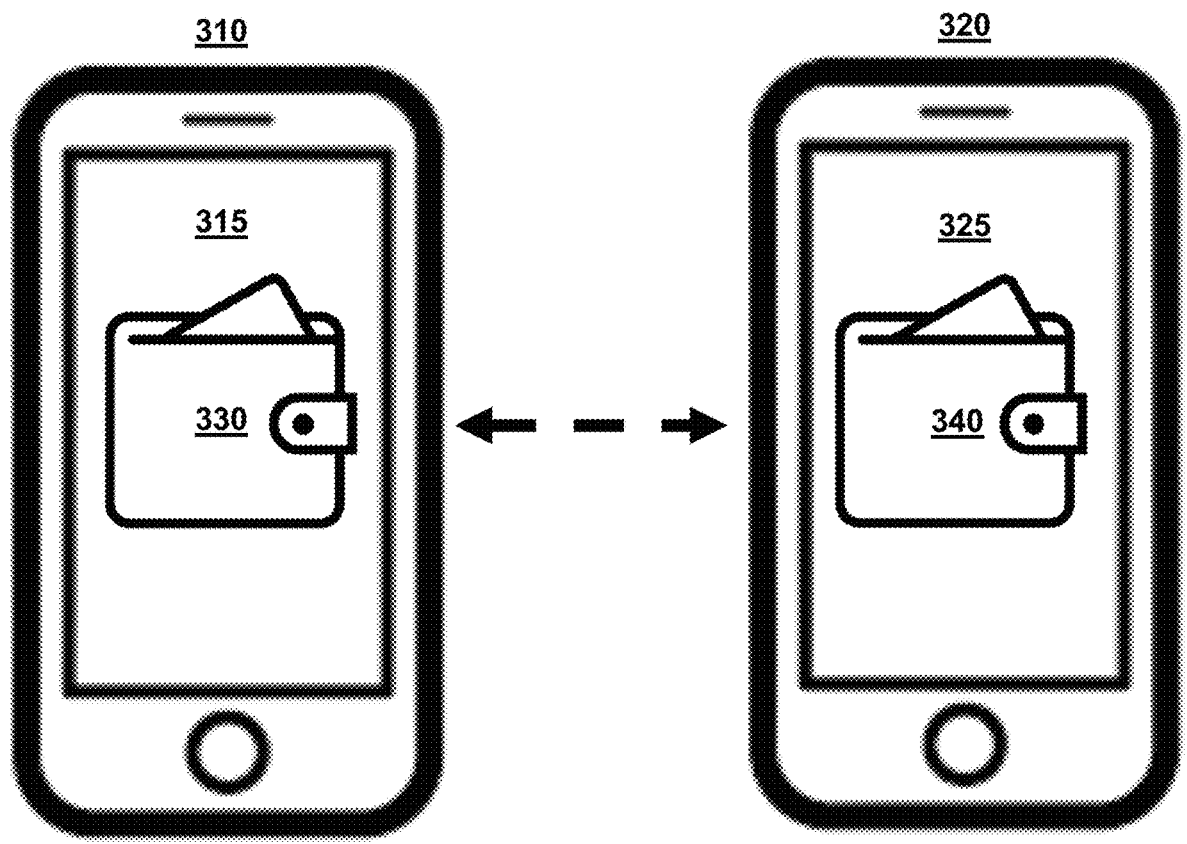
FIG. 3 shows an illustrative diagram for performing a blockchain action, in accordance with one or more embodiments.

FIG. 3 shows an illustrative diagram for performing a blockchain action, in accordance with one or more embodiments. As referred to herein, a "blockchain action" may comprise any action including and/or related to blockchains and blockchain technology. For example, blockchain actions may include conducting transactions, querying a distributed ledger, generating additional blocks for a blockchain, transmitting communications-related nonfungible digital records, performing encryption/decryption, exchanging public/private keys, and/or other actions related to blockchains and blockchain technology. In some embodiments, a blockchain action may comprise the creation, modification, detection, and/or execution of a smart contract or program stored on a blockchain. For example, a smart contract may comprise a program stored on a blockchain that is executed (e.g., automatically and/or without any intermediary's involvement or time loss) when one or more predetermined conditions are met. In some embodiments, a blockchain action may comprise the creation, modification, exchange, and/or review of a digital record (e.g., a digital blockchain-specific record), including a nonfungible digital record. A nonfungible digital record may comprise a digital record that is associated with a good, a service, a smart contract, and/or other content that may be verified by, and stored using, blockchain technology. In some embodiments, blockchain actions may also comprise actions related to mechanisms that facilitate other blockchain actions (e.g., actions related to metering activities for blockchain actions on a given blockchain network).

FIG. 3 includes system 300, which includes user device 310 and user device 320, although other devices and/or components may also be featured in system 300 (e.g., one or more of devices and/or components shown in FIG. 2). User device 310 includes user interface 315. User device 320 includes user interface 325.

In some embodiments, gas may be obtained as part of a blockchain action (e.g., a purchase) using a network-specific cryptocurrency (e.g., ether in the case of Ethereum). The system may require gas (or the amount of the network-specific cryptocurrency corresponding to the required amount of gas) to be transmitted with the blockchain action as an earmark to the blockchain action. In some embodiments, gas that is earmarked for a blockchain action may be refunded back to the originator of the blockchain action if, after the computation is executed, an amount remains unused.

As shown in FIG. 3, one or more user devices may include a cryptography-based, storage application (e.g., cryptography-based, storage application 330 and cryptography-based, storage application 340) used to perform blockchain actions. The cryptography-based, storage application may be used to perform a plurality of blockchain actions across a computer network. For example, the cryptography-based, storage application may comprise a decentralized application that functions to perform one or more blockchain actions.

In some embodiments, the cryptography-based, storage application may comprise and/or be compatible with one or more APIs. For example, an API may be implemented on user device 310 and/or communicate with an API implemented on user device 320. Alternatively or additionally, an API may reside on one or more cloud components. For example, an API may reside on a server and comprise a platform service for a custodial wallet service, decentralized application, etc. An API (which may be a representational state transfer (REST) or web services API layer) may provide a decoupled interface to data and/or functionality of one or more applications.

The API may provide various low-level and/or blockchain-specific operations in order to facilitate real-time recording of transfers of records (or other blockchain actions). For example, the API may provide blockchain actions such as blockchain writes. Furthermore, the API may perform a transfer validation ahead of forwarding the blockchain action (e.g., a transaction) to another service (e.g., a crypto service). The API may then log the outcome. For example, by logging to the blockchain prior to forwarding, the API may maintain internal records and balances without relying on external verification (e.g., which may take up to 10 minutes based on blockchain updating activity).

The API may also provide informational reads. For example, the API (or a platform service powered by the API) may generate blockchain action logs and write to an additional ledger (e.g., an internal record and/or indexer service) the outcome of the reads. If this is done, a user accessing the information through other means may see consistent information such that downstream users ingest the same data point as the user. The API may also provide a unified API to access balances, transaction histories, and/or other blockchain actions' activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

The API may provide a common, language-agnostic way of interacting with an application. In some embodiments, the API may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. Simple Object Access Protocol ("SOAP") web services have traditionally been adopted in the enterprise for publishing internal services as well as for exchanging information with partners in business-to-business ("B2B") transactions.

The API may use various architectural arrangements. For example, system 300 may be partially based on the API, such that there is strong adoption of SOAP and RESTful web services, using resources such as Service Repository and Developer Portal, but with low governance, standardization, and separation of concerns. Alternatively, system 300 may be fully based on the API, such that separation of concerns between layers such as an API layer, services, and applications are in place.

In some embodiments, the system architecture may use a microservice approach. Such systems may use two types of layers: front-end layers and back-end layers, where microservices reside. In this kind of architecture, the role of the API may be to provide integration between front-end and back-end layers. In such cases, the API may use RESTful APIs (exposition to front-end or even communication between microservices). The API may use the Advanced Message Queuing Protocol (AMQP), which is an open standard for passing business messages between applications or organizations. The API may use an open-source, high-performance remote procedure call (RPC) framework that may run in a decentralized application environment. In some embodiments, the system architecture may use an open API approach. In such cases, the API may use commercial or open-source API platforms and their modules. The API may use a developer portal. The API may use strong security constraints applying a web application firewall that protects the decentralized applications and/or the API against common web exploits, bots, and denial-of-service (DDoS) attacks. The API may use RESTful APIs as standards for external integration.

In some embodiments, the system may also use one or more Application Binary Interfaces (ABIs) and an alternative to and/or in addition to an API. An ABI is an interface between two program modules, often between operating systems and user programs. ABIs may be specific to a blockchain protocol. For example, ABI defines the methods and structures used to interact with the binary contract similar to an API, but on a lower level. The ABI indicates the caller of the function to encode (e.g., ABI encoding) the needed information like function signatures and variable declarations in a format that a virtual machine can understand to call that function in bytecode. ABI encoding may be automated by the system using compilers or wallets interacting with the blockchain.

The cryptography-based, storage application may, in some embodiments, correspond to a digital wallet. For example, the digital wallet may comprise a repository that allows users to store, manage, and trade their cryptocurrencies and records, interact with blockchains, and/or conduct blockchain actions using one or more applications. The digital wallet may be specific to a given blockchain protocol or may provide access to multiple blockchain protocols. In some embodiments, the system may use various types of digital wallets such as hot wallets and cold wallets. Hot wallets are connected to the internet while cold wallets are not. Digital wallet holders may hold both a hot wallet and a cold wallet. Hot wallets are most often used to perform blockchain actions, while a cold wallet is generally used for managing a user account and may have no connection to the internet.

In some embodiments, the cryptography-based, storage application may correspond to a key-based wallet or a smart contract wallet. For example, a key-based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (or smart contract code) instead of a private key. As such, a smart contract wallet may improve speed, accuracy, trust, and/or transparency in blockchain actions. In some embodiments, a cryptography-based, storage application may include, or have access to, a key-based wallet or a smart contract wallet. For example, the cryptography-based, storage application may comprise a digital or other construct (e.g., a reference, a pointer, a text on a blockchain, an address, etc.).

In some embodiments, to conduct a blockchain action, user device 310, user interface 315, and/or cryptography-based, storage application 330) may comprise, control, and/or have access to a private key and/or digital signature. For example, system 300 may use cryptographic systems for conducting blockchain actions such as using a cross-network registry and/or self-validating digital records. For example, system 300 may use public-key cryptography, which features a pair of digital keys (e.g., which may comprise strings of data). In such cases, each pair comprises a public key (e.g., which may be public) and a private key (e.g., which may be kept private). System 300 may generate the key pairs using cryptographic algorithms (e.g., featuring one-way functions). System 300 may then encrypt a message (or other blockchain action) using an intended receiver's public key such that the encrypted message may be decrypted only with the receiver's corresponding private key. In some embodiments, system 300 may combine a message with a private key to create a digital signature on the message. For example, the digital signature may be used to verify the authenticity of blockchain actions. As an illustration, when conducting blockchain actions, system 300 may use the digital signature to prove to every node in the system that it is authorized to conduct the blockchain actions.

For example, user device 310 may request a blockchain action (e.g., conduct a transaction). The blockchain action may be authenticated by user device 310 and/or another node (e.g., a user device in the community network of system 300). For example, using cryptographic keys, system 300 may identify users and give access to their respective user accounts (e.g., corresponding digital wallets) within system 300. Using private keys (e.g., known only to the respective users) and public keys (e.g., known to the community network), system 300 may create digital signatures to authenticate the users.

Following an authentication of the blockchain action, the blockchain action may be authorized. For example, after the blockchain action is authenticated between the users, system 300 may authorize the blockchain action prior to adding it to the blockchain. System 300 may add the blockchain action to a blockchain (e.g., blockchain 210 (FIG. 2)) as part of a new block (e.g., block 216 (FIG. 2)). System 300 may perform this based on a consensus of the user devices within system 300. For example, system 300 may rely on a majority (or other metric) of the nodes in the community network to determine that the blockchain action is valid. In response to validation of the block, a node user device (e.g., user device 320) in the community network (e.g., a miner) may receive a reward (e.g., in a given cryptocurrency) as an incentive for validating the block.

To validate the blockchain action, system 300 may use one or more validation protocols and/or validation mechanisms. For example, system 300 may use a proof-of-work mechanism in which a user device must provide evidence that it performed computational work to validate a blockchain action and thus this mechanism provides a manner for achieving consensus in a decentralized manner as well as preventing fraudulent validations. For example, the proof-of-work mechanism may involve iterations of a hashing algorithm. The user device that is successful aggregates and records blockchain actions from a mempool (e.g., a collection of all valid blockchain actions waiting to be confirmed by the blockchain network) into the next block. Alternatively or additionally, system 300 may use a proof-of-stake mechanism in which a user account (e.g., corresponding to a node on the blockchain network) is required to have, or "stake," a predetermined amount of digital records in order for system 300 to recognize it as a validator in the blockchain network.

In response to validation of the block, the block is added to a blockchain (e.g., blockchain 210 (FIG. 2)), and the blockchain action is completed. For example, to add the blockchain action to the blockchain, the successful node (e.g., the successful miner) encapsulates the blockchain action in a new block before transmitting the block throughout system 300.

In some embodiments, a cryptography-based, storage application may comprise a decentralized application. As referred to herein, a "decentralized application" may comprise an application that exists on a blockchain and/or a peer-to-peer network. For example, a decentralized application may comprise an application that has a back end that is in part powered by a decentralized peer-to-peer network such as a decentralized, open-source blockchain with smart contract functionality.

For example, the cryptography-based, storage application (e.g., cryptography-based, storage application 330) may allow a user device (e.g., user device 310) to share files, access, and/or perform a blockchain action with another user device (e.g., user device 320) and/or cryptography-based, storage application (e.g., cryptography-based, storage application 340). For example, the peer-to-peer architecture and decentralized nature allows blockchain actions to be conducted between the user devices without the need of any intermediaries or central authorities.

Figure 4:
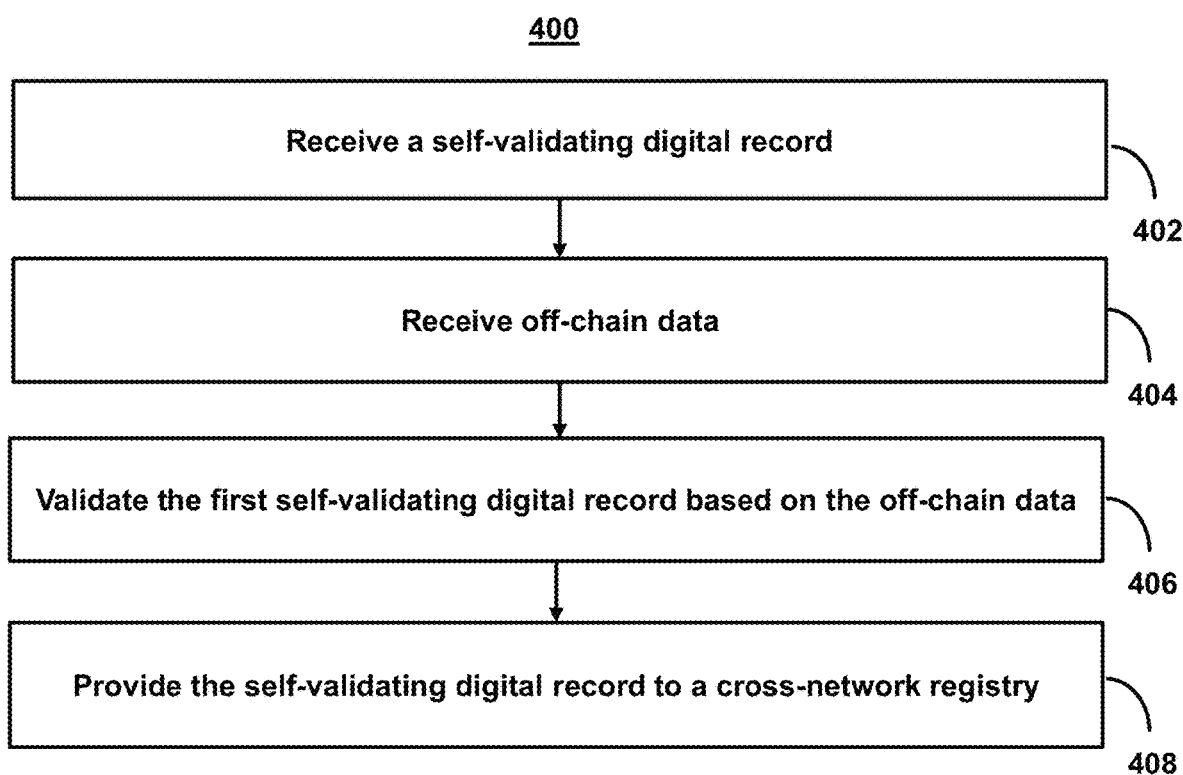
FIG. 4 shows a flowchart of the steps involved in recording of transfers of self-validating digital records across cryptographically secure networks using cross-network registries, in accordance with one or more embodiments.

FIG. 4 shows a flowchart of the steps involved in recording of transfers of self-validating digital records across cryptographically secure networks using cross-network registries, in accordance with one or more embodiments.

At step 402, process 400 (e.g., using one or more components described above) receives a self-validating digital record. For example, the system may receive, at a first off-chain server, a first self-validating digital record from a first entity, wherein the first self-validating digital record corresponds to a first off-chain record designated by the first entity to be transferred to a second entity, and wherein the first self-validating digital record comprises a first validation requirement for validating the first self-validating digital record prior to creation.

At step 404, process 400 (e.g., using one or more components described above) receives off-chain data. For example, the system may receive, at the first off-chain server, first off-chain data. In some embodiments, the system may determine a secure location for holding an off-chain record. By determining this location prior to deployment of the self-validating digital record, the system may encode the secure location (and/or mechanisms for validating data from the secure location) into the self-validating digital record.

In some embodiments, the system may determine an encoding format for a self-executing program of the self-validating digital record, wherein the self-executing program is used to process the first off-chain data. The system may format the first off-chain data based on the encoding format. Self-executing programs on blockchain networks can request data in a specific format by interacting with external data sources or oracles. Self-executing programs typically do not have direct access to external data sources, as they operate within a closed, deterministic environment (e.g., within the self-validating digital record). To request data in a specific format, they rely on oracles, which are external services or entities that provide data from off-chain sources to on-chain self-executing programs. When a self-executing program needs specific data, it makes a request to a trusted oracle service. This request includes details about the required data format, source, and any other relevant parameters. The oracle service receives the request and verifies its authenticity. This may involve checking the request against predefined criteria to ensure that it is legitimate and authorized. After verifying the request, the oracle retrieves the requested data from the off-chain source. The oracle service is responsible for formatting the data as per the specified format or converting it to the required format if necessary. The oracle provides the formatted data as a response to the self-executing program's request. This response is typically in a standardized format that the self-executing program can process. The self-executing program receives the data response from the oracle. It can then process the data according to its logic and rules, taking into account the requested format. The self-executing program can use this data to make decisions or trigger actions within the blockchain network. The trustworthiness of the oracle is crucial in this process. Self-executing programs often rely on multiple oracles or a network of oracles to provide data from diverse and reliable sources. Some blockchain platforms also implement mechanisms for aggregating and validating data from multiple oracles to ensure accuracy.

In some embodiments, the system may extract, by the first off-chain server, implementation details for creating the first self-validating digital record. The system may then generate the first validation requirement based on the implementation details. The implementation details may refer to the blockchain action and/or the asset transfers. Implementation details may include blockchain selections, wallet setups (e.g., wallet creation and management functionality, including key generation, storage, and security measures), transfer details (e.g., that define the sender's and recipient's addresses, specify the asset or token to be transferred, set the amount to be transferred, and include any additional parameters or data required for the transfer), signing details (e.g., how transactions must be digitally signed by the sender using their private key to prove ownership and authorization), block confirmation (e.g., after verification, the transaction is included in a block, and the block is added to the blockchain, and the number of confirmations can vary depending on the blockchain's security requirements), notification and status (e.g., feedback to the sender and recipient about the transaction's status), error handling (e.g., error handling and recovery mechanisms to address issues such as transaction failures, network congestion, and gas limit errors), transaction monitoring (e.g., how to monitor the blockchain for transaction events or changes in account balances to trigger additional actions or notifications), security measures (e.g., key management, encryption, and protection against common vulnerabilities such as replay attacks or double spending), user interface settings, and/or compliance requirements (e.g., to ensure compliance with legal and regulatory requirements, such as Know-Your-Customer (KYC) and Anti-Money Laundering (AML) regulations).

At step 406, process 400 (e.g., using one or more components described above) validates the first self-validating digital record based on the off-chain data. For example, the system may determine, by the first self-validating digital record, that the first validation requirement is met based on the first off-chain data.

In some embodiments, the system may determine, based on a first self-executing program of the self-validating digital record, a pre-deployment validation characteristic for the first validation requirement. For example, the system may determine what criteria are required to be met to effectuate a transfer. In some embodiments, the system may determine that a given off-chain record (e.g., off-chain asset) is immobilized. The system may then determine (e.g., by the same self-executing program or another) that the pre-deployment validation characteristic corresponds to the off-chain data (e.g., data indicating that off-chain asset is immobilized at a secure location).

At step 408, process 400 (e.g., using one or more components described above) provides the self-validating digital record to a cross-network registry. For example, the system may, in response to determining that the first validation requirement is met, provide the first self-validating digital record to a cross-network registry, wherein the cross-network registry confirms transfer of the first off-chain record to the second entity by creating the first self-validating digital record on a first cryptographically secure network. The digital record may also include digital point in time validation record and be stored on-chain for auditability.

In some embodiments, the system may detect (e.g., by the first off-chain server) an instance of the first self-validating digital record on the first cryptographically secure network. The appearance of this instance on the blockchain may act as confirmation that the transfer is complete. As such, the system may generate a communication to the secure location to release the off-chain record to the second entity. For example, in some cases, asset locking may involve digital signatures and authorization mechanisms. For instance, when locking assets in a wallet for a specific transfer, the system may need to provide a digital signature to confirm the lock and verification may occur by checking the validity of the digital signature against the wallet owner's private key.

In some embodiments, the cross-network registry may also enforce one or more validation requirements. For example, the system may determine, by a fourth self-executing program at the cross-network registry, that a second validation requirement for validating the first self-validating digital record prior to creation is required. The system may determine based on a fourth self-executing program a second pre-deployment validation characteristic for the second validation requirement. The system may retrieve second off-chain data. The system may compare the second pre-deployment validation characteristic to determine whether it corresponds to the second off-chain data.

For example, the system may enforce geographic restrictions, wherein the second pre-deployment validation characteristic corresponds to a geographic restriction of transfers of the first off-chain record, and wherein the second off-chain data indicates a geographic location of the second entity. In another example, the system may enforce KYC restriction of transfers, and the off-chain data may indicate a known customer number of the second entity. In yet another example, the system may enforce a temporal restriction of transfers, and the off-chain data may indicate a current time. In yet another example, the system may enforce a network route restriction (e.g., what networks, computer systems, geographic regions, etc.) of transfers, and the off-chain data may indicate a network route. In yet another example, the system may enforce an asset category restriction (e.g., what types of assets may be transferred) of transfers, and the off-chain data may indicate an asset type.

In some embodiments, the system may retrieve, at the cross-network registry, a complier. The system may compile a fifth self-executing program for creating the first self-validating digital record on the first cryptographically secure network. By doing so, the system avoids the multi-chain issues with consensus mechanisms and atomicity.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, at a cross-network registry, a first self-validating digital record; and confirming, by a cross-network registry, transfer of a first off-chain record by creating the first self-validating digital record on a first cryptographically secure network.

2. A method for real-time recording of transfers of self-validating digital records across cryptographically secure networks using cross-network registries.

3. The method of any one of the preceding embodiments, the method comprising: receiving, at a first off-chain server, a first self-validating digital record from a first entity, wherein the first self-validating digital record corresponds to a first off-chain record designated by the first entity to be transferred to a second entity, and wherein the first self-validating digital record comprises a first validation requirement for validating the first self-validating digital record prior to creation; receiving, at the first off-chain server, first off-chain data; determining, by the first self-validating digital record, that the first validation requirement is met based on the first off-chain data; and in response to determining that the first validation requirement is met, providing the first self-validating digital record to a cross-network registry, wherein the cross-network registry confirms transfer of the first off-chain record to the second entity by creating the first self-validating digital record on a first cryptographically secure network.

4. The method of any one of the preceding embodiments, wherein the first self-validating digital record designates the first cryptographically secure network.

5. The method of any one of the preceding embodiments, wherein the cross-network registry compiles the first self-validating digital record based on a protocol for the first cryptographically secure network.

6. The method of any one of the preceding embodiments, wherein determining that the first validation requirement is met based on the first off-chain data comprises: determining based on a first self-executing program of the first self-validating digital record a first pre-deployment validation characteristic for the first validation requirement, wherein the first pre-deployment validation characteristic confirms that the first off-chain record is immobilized at a secure location; and determining, based on a second self-executing program of the first self-validating digital record, that the first pre-deployment validation characteristic corresponds to the first off-chain data.

7. The method of any one of the preceding embodiments, further comprising: detecting, by the first off-chain server, an instance of the first self-validating digital record on the first cryptographically secure network; and generating a communication to the secure location to release the first off-chain record to the second entity, wherein the communication comprises a digital signature for the secure location.

8. The method of any one of the preceding embodiments, further comprising: determining a secure location of the first off-chain record; and determining the first validation requirement based on the secure location.

9. The method of any one of the preceding embodiments, wherein receiving the first off-chain data further comprises: determining an encoding format for a third self-executing program of the first self-validating digital record, wherein the third self-executing program is used to process the first off-chain data; and formatting the first off-chain data based on the encoding format.

10. The method of any one of the preceding embodiments, wherein confirming the transfer of the first off-chain record to the second entity by creating the first self-validating digital record on the first cryptographically secure network further comprises: determining, by a fourth self-executing program at the cross-network registry, that a second validation requirement for validating the first self-validating digital record prior to creation is required; determining based on a fourth self-executing program a second pre-deployment validation characteristic for the second validation requirement, wherein the second pre-deployment validation characteristic corresponds to a geographic restriction of transfers of the first off-chain record; retrieving second off-chain data, wherein the second off-chain data indicates a geographic location of the second entity; and determining the second pre-deployment validation characteristic corresponds to the second off-chain data.

11. The method of any one of the preceding embodiments, wherein confirming the transfer of the first off-chain record to the second entity by creating the first self-validating digital record on the first cryptographically secure network further comprises:
determining, by a fourth self-executing program at the cross-network registry, that a second validation requirement for validating the first self-validating digital record prior to creation is required; determining based on a fourth self-executing program a second pre-deployment validation characteristic for the second validation requirement, wherein the second pre-deployment validation characteristic corresponds to a know-your-customer (KYC) restriction of transfers of the first off-chain record; retrieving second off-chain data, wherein the second off-chain data indicates a known customer number of the second entity; and determining the second pre-deployment validation characteristic corresponds to the second off-chain data.

12. The method of any one of the preceding embodiments, wherein confirming the transfer of the first off-chain record to the second entity by creating the first self-validating digital record on the first cryptographically secure network further comprises:
determining, by a fourth self-executing program at the cross-network registry, that a second validation requirement for validating the first self-validating digital record prior to creation is required; determining based on a fourth self-executing program a second pre-deployment validation characteristic for the second validation requirement, wherein the second pre-deployment validation characteristic corresponds to a temporal restriction of transfers of the first off-chain record; retrieving second off-chain data, wherein the second off-chain data indicates a current time; and determining the second pre-deployment validation characteristic corresponds to the second off-chain data.

13. The method of any one of the preceding embodiments, wherein confirming the transfer of the first off-chain record to the second entity by creating the first self-validating digital record on the first cryptographically secure network further comprises: determining, by a fourth self-executing program at the cross-network registry, that a second validation requirement for validating the first self-validating digital record prior to creation is required; determining based on a fourth self-executing program a second pre-deployment validation characteristic for the second validation requirement, wherein the second pre-deployment validation characteristic corresponds to a network route restriction of transfers of the first off-chain record; retrieving second off-chain data, wherein the second off-chain data indicates a network route for the transfer of the first off-chain record; and determining that the second pre-deployment validation characteristic corresponds to the second off-chain data.

14. The method of any one of the preceding embodiments, wherein confirming the transfer of the first off-chain record to the second entity by creating the first self-validating digital record on the first cryptographically secure network further comprises:
determining, by a fourth self-executing program at the cross-network registry, that a second validation requirement for validating the first self-validating digital record prior to creation is required; determining based on a fourth self-executing program a second pre-deployment validation characteristic for the second validation requirement, wherein the second pre-deployment validation characteristic corresponds to an asset type restriction of transfers of the first off-chain record; retrieving second off-chain data, wherein the second off-chain data indicates an asset type of the first off-chain record; and determining that the second pre-deployment validation characteristic corresponds to the second off-chain data.

15. The method of any one of the preceding embodiments, wherein receiving, at the first off-chain server, the first self-validating digital record from the first entity further comprises: extracting, by the first off-chain server, implementation details for creating the first self-validating digital record; and generating the first validation requirement based on the implementation details.

16. The method of any one of the preceding embodiments, wherein providing the first self-validating digital record to the cross-network registry further comprises: retrieving, at the cross-network registry, a complier; and compiling a fifth self-executing program for creating the first self-validating digital record on the first cryptographically secure network.

17. One or more non-transitory, machine-readable mediums storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

We claim:

1. A system for real-time recording of transfers of self-validating digital records across cryptographically secure networks using cross-network registries, the system comprising:
one or more processors: and
one or more non-transitory, computer-readable mediums comprising instructions recorded thereon that when executed by the one or more processors cause operations comprising:
receiving, at a first off-chain server, a first self-validating digital record from a first entity, wherein the first self-validating digital record corresponds to a first off-chain record designated by the first entity to be transferred to a second entity during a first transfer, wherein the first self-validating digital record indicates a first cryptographically secure network for confirming the first transfer, wherein the first self-validating digital record comprises a first validation requirement for validating the first self-validating digital record prior to creation, wherein the first validation requirement is encoded by the first entity in the first self-validating digital record, and wherein the first self-validating digital record uses the first validation requirement to validate itself for creation on first cryptographically secure network;

receiving, at the first off-chain server, first off-chain data from an off-chain data source;

determining, by the first self-validating digital record, that the first validation requirement is met by executing a self-executing program that compares the first off-chain data to a pre-deployment validation characteristic for the first validation requirement; and in response to determining that the first validation requirement is met;

compiling, at the first off-chain server, the first self-validating digital record, the first off-chain data, and the first validation requirement in a first self-executing program corresponding to the first self-validating digital record; and providing the first self-executing program corresponding to the first self-validating digital record to a cross-network registry, wherein the cross-network registry modifies and re-compiles the first self-executing program corresponding to the first self-validating digital record based on a protocol for the first cryptographically secure network, and wherein the cross-network registry confirms the first transfer by creating the first self-validating digital record on the first cryptographically secure network by executing the first self-executing program.

2. A method for real-time recording of transfers of self-validating digital records across cryptographically secure networks using cross-network registries, the method comprising:

receiving, at a first off-chain server, a first self-validating digital record from a first entity, wherein the first self-validating digital record corresponds to a first off-chain record designated by the first entity to be transferred to a second entity, wherein the first self-validating digital record comprises a first validation requirement for validating the first self-validating digital record prior to creation, wherein the first validation requirement is encoded by the first entity in the first self-validating digital record, and wherein the first self-validating digital record uses the first validation requirement to validate itself for creation on first cryptographically secure network;

receiving, at the first off-chain server, first off-chain data;

determining, by the first self-validating digital record, that the first validation requirement is met based on the first off-chain data; and in response to determining that the first validation requirement is met:

compiling, at the first off-chain server, the first self-validating digital record, the first off-chain data, and the first validation requirement in a first self-executing program corresponding to the first self-validating digital record; and providing the first self-executing program corresponding to the first self-validating digital record to a cross-network registry, wherein the cross-network registry confirms transfer of the first off-chain record to the second entity by creating the first self-validating digital record on the first cryptographically secure network by executing the first self-executing program.

3. The method of claim 2, wherein determining that the first validation requirement is met based on the first off-chain data comprises:

determining based on a first self-executing program of the first self-validating digital record a first pre-deployment validation characteristic for the first validation requirement, wherein the first pre-deployment validation characteristic confirms that the first off-chain record is immobilized at a secure location; and determining, based on a second self-executing program of the first self-validating digital record, that the first pre-deployment validation characteristic corresponds to the first off-chain data.

4. The method of claim 3, further comprising:

detecting, by the first off-chain server, an instance of the first self-validating digital record on the first cryptographically secure network; and generating a communication to the secure location to release the first off-chain record to the second entity, wherein the communication comprises a digital signature for the secure location.

5. The method of claim 2, further comprising:

determining a secure location of the first off-chain record; and determining the first validation requirement based on the secure location.

6. The method of claim 2, wherein receiving the first off-chain data further comprises:

determining an encoding format for a third self-executing program of the first self-validating digital record, wherein the third self-executing program is used to process the first off-chain data; and formatting the first off-chain data based on the encoding format.

7. The method of claim 2, wherein confirming the transfer of the first off-chain record to the second entity by creating the first self-validating digital record on the first cryptographically secure network further comprises:

determining, by a fourth self-executing program at the cross-network registry, that a second validation requirement for validating the first self-validating digital record prior to creation is required;

determining based on a fourth self-executing program a second pre-deployment validation characteristic for the second validation requirement, wherein the second pre-deployment validation characteristic corresponds to a geographic restriction of transfers of the first off-chain record;

retrieving second off-chain data, wherein the second off-chain data indicates a geographic location of the second entity; and determining that the second pre-deployment validation characteristic corresponds to the second off-chain data.

8. The method of claim 2, wherein confirming the transfer of the first off-chain record to the second entity by creating the first self-validating digital record on the first cryptographically secure network further comprises:

determining, by a fourth self-executing program at the cross-network registry, that a second validation requirement for validating the first self-validating digital record prior to creation is required;

determining based on a fourth self-executing program a second pre-deployment validation characteristic for the second validation requirement, wherein the second pre-deployment validation characteristic corresponds to a KYC restriction of transfers of the first off-chain record;

retrieving second off-chain data, wherein the second off-chain data indicates a known customer number of the second entity; and determining that the second pre-deployment validation characteristic corresponds to the second off-chain data.

9. The method of claim 2, wherein confirming the transfer of the first off-chain record to the second entity by creating the first self-validating digital record on the first cryptographically secure network further comprises:

determining, by a fourth self-executing program at the cross-network registry, that a second validation requirement for validating the first self-validating digital record prior to creation is required;

determining based on a fourth self-executing program a second pre-deployment validation characteristic for the second validation requirement, wherein the second pre-deployment validation characteristic corresponds to a temporal restriction of transfers of the first off-chain record;

retrieving second off-chain data, wherein the second off-chain data indicates a current time; and determining that the second pre-deployment validation characteristic corresponds to the second off-chain data.

10. The method of claim 2, wherein confirming the transfer of the first off-chain record to the second entity by creating the first self-validating digital record on the first cryptographically secure network further comprises:

determining, by a fourth self-executing program at the cross-network registry, that a second validation requirement for validating the first self-validating digital record prior to creation is required;

determining based on a fourth self-executing program a second pre-deployment validation characteristic for the second validation requirement, wherein the second pre-deployment validation characteristic corresponds to a network route restriction of transfers of the first off-chain record;

retrieving second off-chain data, wherein the second off-chain data indicates a network route for the transfer of the first off-chain record; and determining that the second pre-deployment validation characteristic corresponds to the second off-chain data.

11. The method of claim 2, wherein confirming the transfer of the first off-chain record to the second entity by creating the first self-validating digital record on the first cryptographically secure network further comprises:

determining, by a fourth self-executing program at the cross-network registry, that a second validation requirement for validating the first self-validating digital record prior to creation is required;

determining based on a fourth self-executing program a second pre-deployment validation characteristic for the second validation requirement, wherein the second pre-deployment validation characteristic corresponds to an asset type restriction of transfers of the first off-chain record;

retrieving second off-chain data, wherein the second off-chain data indicates an asset type of the first off-chain record; and determining that the second pre-deployment validation characteristic corresponds to the second off-chain data.

12. The method of claim 2, wherein receiving, at the first off-chain server, the first self-validating digital record from the first entity further comprises:

extracting, by the first off-chain server, implementation details for creating the first self-validating digital record; and generating the first validation requirement based on the implementation details.

13. The method of claim 2, wherein providing the first self-validating digital record to the cross-network registry further comprises:

retrieving, at the cross-network registry, a complier; and compiling a fifth self-executing program for creating the first self-validating digital record on the first cryptographically secure network.

14. One or more non-transitory, computer-readable mediums comprising instructions recorded thereon that when executed by one or more processors cause operations comprising:

receiving, at a cross-network registry, a first self-validating digital record, wherein the first self-validating digital record is validated by:

receiving, at a first off-chain server, the first self-validating digital record from a first entity, wherein the first self-validating digital record corresponds to a first off-chain record designated by the first entity to be transferred to a second entity, wherein the first self-validating digital record comprises a first validation requirement for validating the first self-validating digital record prior to creation, wherein the first validation requirement is encoded by the first entity in the first self-validating digital record, and wherein the first self-validating digital record uses the first validation requirement to validate itself for creation on first cryptographically secure network;

receiving, at the first off-chain server, first off-chain data; and determining, by the first self-validating digital record, that the first validation requirement is met based on the first off-chain data, wherein the first self-validating digital record, the first off-chain data, and the validation requirement are complied at the first off-chain server in response to determining that the first validation requirement is met; and confirming, by the cross-network registry, transfer of the first off-chain record to the second entity by creating the first self-validating digital record on a first cryptographically secure network.

15. The one or more non-transitory, computer-readable mediums of claim 14, wherein determining that the first validation requirement is met based on the first off-chain data comprises:

determining based on a first self-executing program of the first self-validating digital record a first pre-deployment validation characteristic for the first validation requirement, wherein the first pre-deployment validation characteristic confirms that the first off-chain record is immobilized at a secure location; and determining, based on a second self-executing program of the first self-validating digital record, that the first pre-deployment validation characteristic corresponds to the first off-chain data.

16. The one or more non-transitory, computer-readable mediums of claim 15, further comprising:

detecting, by the first off-chain server, an instance of the first self-validating digital record on the first cryptographically secure network; and generating a communication to the secure location to release the first off-chain record to the second entity, wherein the communication comprises a digital signature for the secure location.

17. The one or more non-transitory, computer-readable mediums of claim 14, wherein the operations further cause operations comprising:
- determining a secure location of the first off-chain record; and
- determining the first validation requirement based on the secure location.

18. The one or more non-transitory, computer-readable mediums of claim 14, wherein receiving the first off-chain data further comprises:
- determining an encoding format for a third self-executing program of the first self-validating digital record, wherein the third self-executing program is used to process the first off-chain data; and
- formatting the first off-chain data based on the encoding format.

19. The one or more non-transitory, computer-readable mediums of claim 14, wherein the first self-validating digital record designates the first cryptographically secure network.

20. The one or more non-transitory, computer-readable mediums of claim 14, wherein the cross-network registry compiles the first self-validating digital record based on a protocol for the first cryptographically secure network.

* * * * *